US009305327B2

United States Patent
Sakamoto et al.

(10) Patent No.: US 9,305,327 B2
(45) Date of Patent: Apr. 5, 2016

(54) IMAGE PROCESSING APPARATUS AND CONTROL METHOD THEREOF

(71) Applicant: CANON KABUSHIKI KAISHA, Tokyo (JP)

(72) Inventors: Shigeru Sakamoto, Ichikawa (JP); Satoru Mamiya, Yokohama (JP); Jun Fujisawa, Saratoga (JP); Shuichi Okamura, Kawasaki (JP); Shinya Takeichi, Kawasaki (JP); Atsushi Date, Tokyo (JP); Takeshi Suzuki, Tachikawa (JP); Akihiro Takamura, Kokubunji (JP); Waki Midorikawa, Kawasaki (JP); Toru Nomakuchi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/217,993

(22) Filed: Mar. 18, 2014

(65) Prior Publication Data

US 2014/0198115 A1 Jul. 17, 2014

Related U.S. Application Data

(63) Continuation of application No. 12/486,336, filed on Jun. 17, 2009, now Pat. No. 8,717,380.

(30) Foreign Application Priority Data

Jul. 4, 2008 (JP) .................................. 2008-175906
Jul. 11, 2008 (JP) .................................. 2008-181979

(51) Int. Cl.
G09G 5/00 (2006.01)
G06T 1/20 (2006.01)
G09G 5/36 (2006.01)
G06T 11/00 (2006.01)
G09G 5/14 (2006.01)
G09G 5/377 (2006.01)

(52) U.S. Cl.
CPC . *G06T 1/20* (2013.01); *G06T 11/00* (2013.01); *G09G 5/363* (2013.01); *G09G 5/006* (2013.01); *G09G 5/14* (2013.01); *G09G 5/377* (2013.01); *G09G 2340/125* (2013.01)

(58) Field of Classification Search
None
See application file for complete search history.

(56) References Cited

U.S. PATENT DOCUMENTS

2003/0016223 A1* 1/2003 Miyauchi ...................... 345/505
2005/0017986 A1* 1/2005 Anwar et al. .................. 345/629
2005/0116946 A1* 6/2005 Chung .......................... 345/418

* cited by examiner

*Primary Examiner* — Jwalant Amin
(74) *Attorney, Agent, or Firm* — Cowan, Liebowitz & Latman, P.C.

(57) ABSTRACT

An image processing apparatus and its control method receives a drawing command including a moving image drawing command and a graphics drawing command and performs drawing processing. A drawing command is received, and the moving image drawing command is separated from the graphics drawing command. A graphics drawing unit obtains the result of graphics drawing in accordance with the graphics drawing command. A moving image drawing unit generates moving image data processed in accordance with the moving image drawing command. A composition unit composes the result of graphics drawing by the graphics drawing unit with the moving image data generated by the moving image drawing unit.

4 Claims, 15 Drawing Sheets

IMAGE PROCESSING APPARATUS AND CONTROL METHOD THEREOF

CROSS-REFERENCE TO RELATED APPLICATIONS

This application is a continuation of application Ser. No. 12/486,336, filed Jun. 17, 2009 the entire disclosure of which is hereby incorporated by reference.

BACKGROUND OF THE INVENTION

1. Field of the Invention

The present invention relates to an image processing apparatus and its control method for inputting graphics data and moving image data, composing these data and outputting composite data.

2. Description of the Related Art

As a technique for composing graphics data with moving image data and outputting composite data, the following two types of methods are known.

(1) Obtaining moving image data by frame, generating instantaneous still image data, and rendering the still image data as a part of graphics elements with graphics data to be composed.

(2) Separately performing processing on moving image data and graphics data with a moving image data processing system and a graphics data processing system, and composing data processed by the respective processing systems.

Video editing software operating on a computer is known as representative software based on the method (1). Further, as a technique based on the method (2), Japanese Patent Laid-Open No. 06-335022 (D1) discloses a technique in which a graphics generator that processes a drawing command and a video data generator that outputs video data are separately provided, and the outputs of the graphics generator and the video data generator are switched based on transparent data included in the drawing command. Further, Japanese Patent Laid-Open No. 07-72850 (D2) discloses a technique of separately providing a moving image frame buffer and a graphics frame buffer and combining graphics data with moving image data under the control of a window system. Further, Japanese Patent Laid-Open No. 2002-222428 (D3) discloses a display apparatus provided with separate graphics generator and video processor. According to the document D3, the graphics generator generates graphics data from a drawing command, generates video information (area information and translucent information) included in a graphics area and holds the generated data. On the other hand, the video processor performs video reduction processing using the video information. Then a composer performs translucent composition on the graphics data and the video data.

Further, Japanese Patent Laid-Open No. 10-020850 (D4) discloses a superimposing apparatus for superimposing video data and graphics data and displaying the superimposed data. According to the document D4, in an area where the graphics data and the video data overlap each other, priorities of the graphics data and the video data are selectively designated, thereby superimposed display of the video data and the graphics data can be realized at a low cost.

Further, Japanese Patent Laid-Open No. 2002-229767 (D5) discloses a moving image reproducing apparatus for reproduction of combined display of plural moving images and a drawn image. According to the document D5, in an environment where plural software operate, a display is produced by some software over a display produced by other software. A frame image is drawn in accordance with shape setting designation information of a moving image to be reproduced, thereby superimposition of a non-rectangular image is realized.

Further, Japanese Patent Laid-Open No. 2001-184523 (D6) discloses a technique of composing moving image and moving object while changing the order of superimposition. According to the document D6, a depth value indicating the priorities for front-display of the moving image and the moving object is applied, and shading is performed based on the depth value.

Further, Japanese Patent Laid-Open No. 2003-338991 (D7) discloses an image display apparatus for performing resolution-conversion on moving image data and graphics data in different resolutions and composing the data. According to the document D7, a moving image conversion unit and a graphic conversion unit respectively perform resolution conversion before composition of the moving image data and the graphics data.

However, in the above-described conventional techniques, it is impossible to compose graphics data and moving image data and output the composite data while perform general rendering processing applied to still image data (deformation, rotation, transparent processing and the like) on the moving image data, in real time.

In the above-described method (1), various types of rendering processings can be applied to moving image data, while these processings cannot be performed in real time. On the other hand, in the above-described method (2), realtime processing can be ensured, however, rendering processing almost cannot be freely performed on moving image data. That is, conventionally, it is impossible to ensure both freedom and real time processability in rendering processing.

Further, in the above-described method (1), functional problems can be solved by introducing a very fast drawing processor. However, since such processor is very expensive, it cannot be incorporated in an apparatus for consumers.

Further, when an image including moving image and graphic image is displayed, to display the moving image in a graphics-drawn frame, it is necessary to display graphics data and moving image data in synchronization with each other. However, in an image display apparatus provided with separated moving image and graphics processing systems, time for completion of processing of moving image data and time for completion of processing of graphics data cannot be synchronized with each other. Accordingly, 1:1 binding between graphics and moving image frames cannot be realized.

Regarding this problem, in the moving image display apparatus disclosed in the document D2, only the position of composition is designated using an address management information selection unit for a frame memory. Accordingly, the positions of moving data to be composed and image data can be designated, however, a particular moving image data frame and a particular still image data frame cannot be composed. Further, a drawing circuit disclosed in the document D4 independently generates identification bits of video and graphics data with a graphics identification circuit connected only to the drawing circuit and a video identification circuit connected only to a video pixel generation circuit. Accordingly, processing times in the drawing circuit and the video pixel circuit cannot be synchronized with each other. Further, in the moving image reproduction method disclosed in the document D5, a window system is used for setting of shape information of a moving image and control of a drawing unit to draw a frame image, by each frame of the moving image. Accordingly, overhead occurs in the window system by frame, thereby the moving image reproducing speed is limited. Further, when image processing completion time in the drawing unit and that in the shape setting unit do not correspond with each other, the shape setting information and the result of drawing cannot be displayed in synchronization with each other.

Further, in the image generation system disclosed in the document D6, when a moving object and movie data are composed in other frame than a final frame of the movie data, time for moving processing of the moving object is not considered. Accordingly, if the movie data which is operating and the object after moving processing are composed, a video frame in which route information is designated and the composed moving object are shifted. Further, in the image display apparatus disclosed in the document D7, the graphic conversion unit and the moving image conversion unit respectively perform conversion processing and the results of conversion are composed and displayed. Accordingly, if the image processing by the moving image conversion unit and that by the graphic conversion unit are not completed simultaneously, the converted moving image data and the graphics data cannot be displayed in synchronization with each other. Further, in the image display apparatus disclosed in the document D3, superimposition between an image of a part to be composed in translucent state and a video image is designated using a setting unit. In the document D3, if the processing of the image of the part and that of the video image are not completed always with the same latency, then the image of the part and the video image cannot be composed and displayed in synchronization with each other.

SUMMARY OF THE INVENTION

An aspect of the present invention is to eliminate the above-mentioned problems with the conventional technology.

According to an aspect of the present invention, it is possible to compose moving image data with graphics data while respectively image-map the moving image data and the graphics data, and obtain composite image data.

According to another aspect of the present invention, an image processing apparatus and its control method enabling synchronized display of graphics data and moving image data can be provided.

Further, according to another aspect of the present invention, there is provided an image processing apparatus for receiving a drawing command including a moving image drawing command and a graphics drawing command and performing drawing processing, comprises: a separation unit that receives the drawing command and separates the moving image drawing command from the graphics drawing command; a graphics drawing unit that obtains the result of graphics drawing in accordance with the graphics drawing command included in the drawing command separated by the separation unit; a moving image drawing unit that generates moving image data processed in accordance with the moving image drawing command separated by the separation unit; and a composition unit that composes the result of graphics drawing by the graphics drawing unit with the moving image data generated by the moving image drawing unit.

Further, according to another aspect of the present invention, there is provided a control method for an image processing apparatus for receiving a drawing command including a moving image drawing command and a graphics drawing command and performing drawing processing, comprises: a separation step of receiving the drawing command and separating the moving image drawing command from the graphics drawing command; a graphics drawing step of obtaining the result of graphics drawing in accordance with the graphics drawing command included in the drawing command separated in the separation step; a moving image drawing step of generating moving image data processed in accordance with the moving image drawing command separated in the separation unit; and a composition step of composing the result of graphics drawing in the graphics drawing step with the moving image data generated in the moving image drawing unit.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
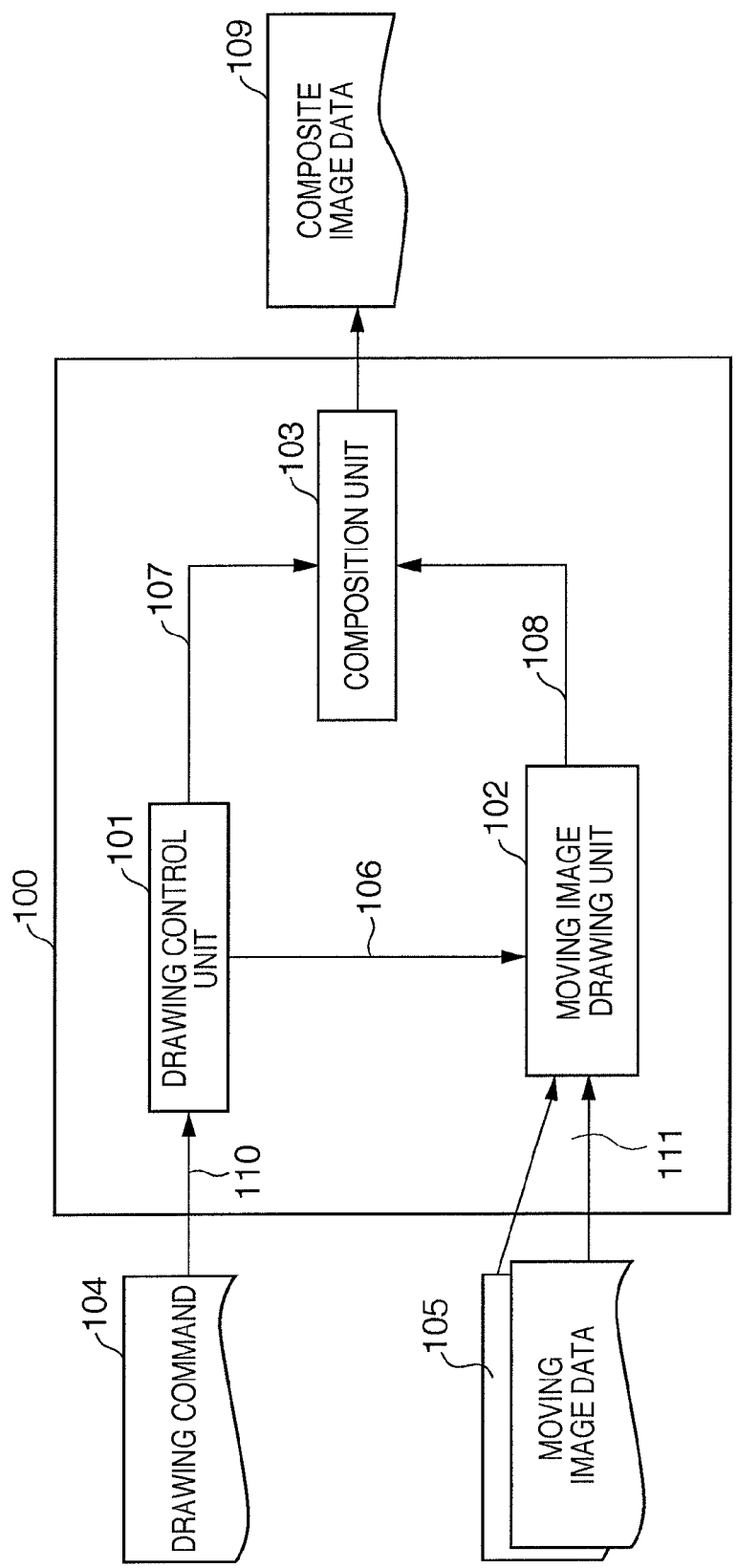
FIG. 1 is a block diagram describing a configuration of an image processing apparatus according to an exemplary first embodiment of the present invention.

FIG. 1 is a block diagram describing a configuration of an image processing apparatus according to an exemplary first embodiment of the present invention.

In FIG. 1, an image processing apparatus 100 has a drawing control unit 101, a moving image drawing unit 102 and a composition unit 103. The drawing control unit 101 receives a drawing command 104 via a drawing command path 110, generates a moving image drawing command 106 based on the drawing command 104, and outputs the command 106 to the moving image drawing unit 102. Further, the drawing control unit 101 performs graphics drawing based on the drawing command 104 to generate graphics data, and outputs graphics data 107 to the composition unit 103. The moving image drawing unit 102 inputs moving image data 105 via a moving image path 111, generates processed moving image data 108 in accordance with the moving image drawing command 106 supplied from the drawing control unit 101, and supplies the processed moving image data 108 to the composition unit 103. The composition unit 103 composes the graphics data 107 with the processed moving image data 108 thereby generates composite image data 109 and outputs the generated composite image data 109.

Figure 2:
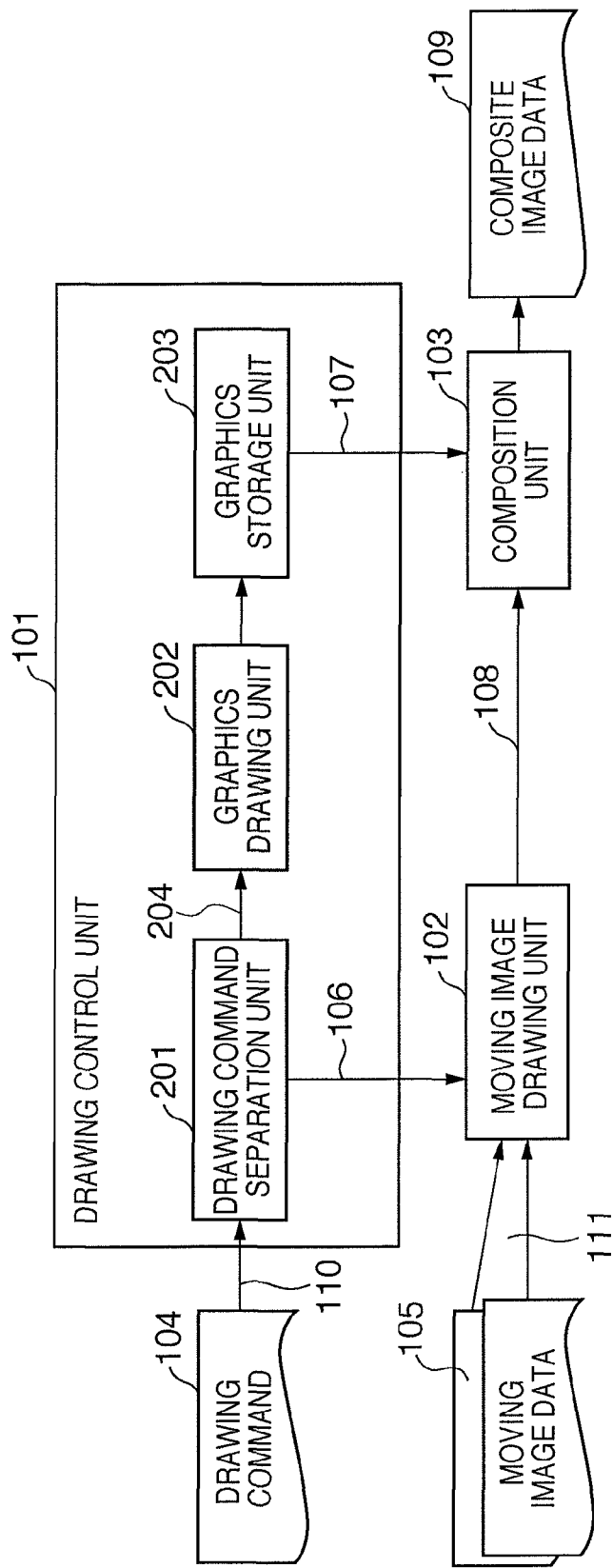
FIG. 2 is a block diagram describing a functional configuration of a drawing control unit according to the first embodiment of the present invention.

FIG. 2 is a block diagram describing a functional configuration of the drawing control unit 101 according to the first embodiment of the preset invention. In FIG. 2, elements corresponding to those in the above-described FIG. 1 have the same reference numerals and explanations of the elements will be omitted.

A drawing command separation unit 201 generates a graphics drawing command 204 and the moving image drawing command 106 based on the drawing command 104. A graphics drawing unit 202 performs graphics drawing processing in accordance with instructions of the graphics drawing command 204, and outputs the result of processing to a graphics storage unit 203. The above-described graphics data 107 is outputted from the graphics storage unit 203 to the composition unit 103.

Figure 3:
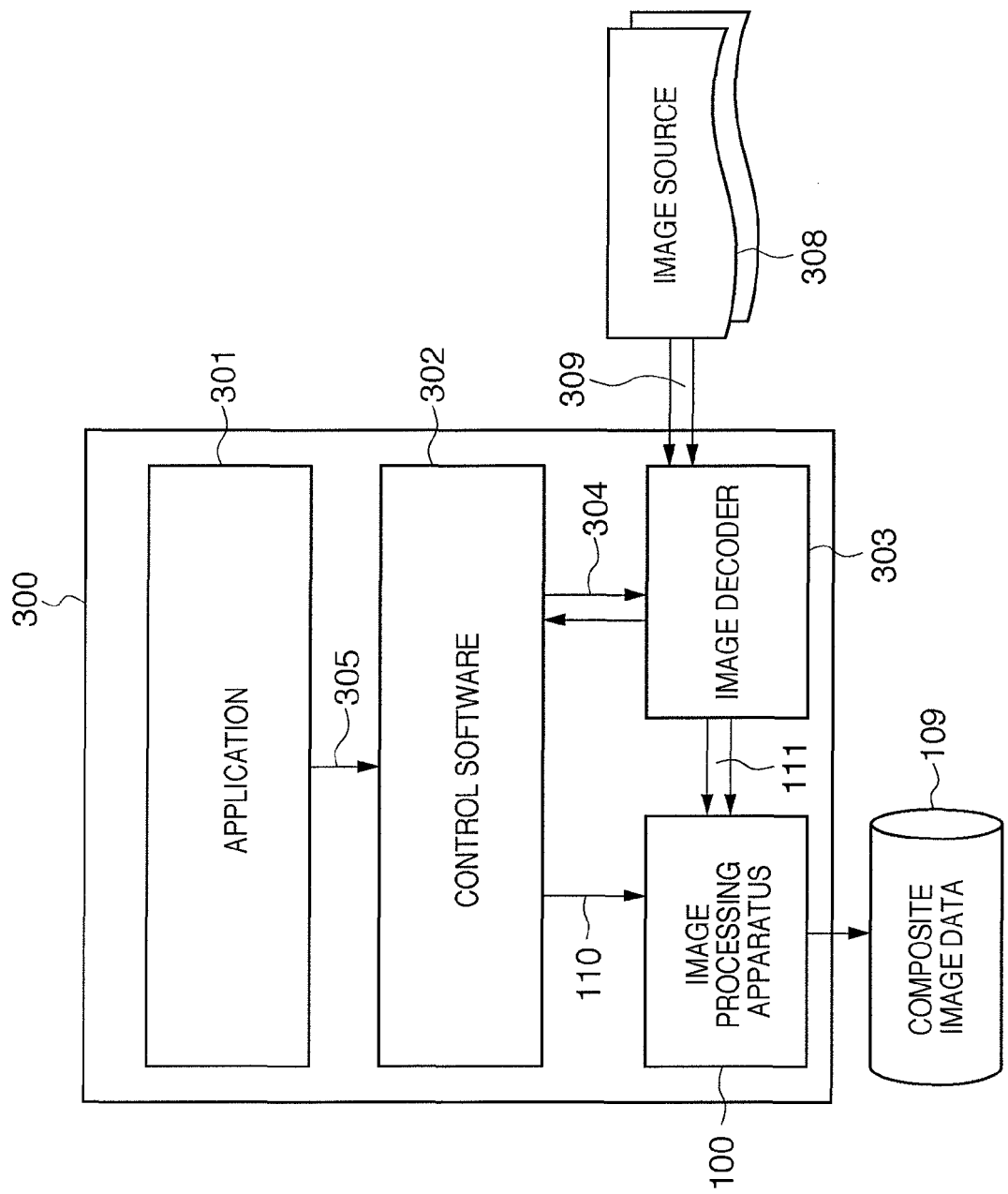
FIG. 3 is a block diagram describing a configuration of an image processing system using the image processing apparatus according to the first embodiment.

FIG. 3 is a block diagram describing a configuration of an image processing system 300 using the image processing apparatus 100 according to the first embodiment.

The image processing system 300 has an application 301, control software 302, the image processing apparatus 100 and an image decoder 303. The control software 302 receives a document generated by the application 301 via a document path 305 and delivers the document to the image processing apparatus 100. Note that the document includes an image drawing instruction and external document reference information as typified by URI information. An image source 308 is inputted via an image source input path 309. The image source input path 309 may be physically single or plural paths. Further, it may be arranged such that plural image sources are inputted by time-divisionally using physically single image source input path 309.

Next, the outline of the operation of the entire image processing system 300 will be described, and the operation of the image processing apparatus 100 will be described in detail.

(1) Operation of Image Processing System 300

The image processing system 300 performs (1-1) moving image generation processing, (1-2) drawing command generation processing with respect to the image processing apparatus 100.

(1-1) Moving Image Generation Processing

Regarding moving image data generation processing performed by the image processing system 300, mainly the operation of the control software 302 will be described.

As moving image input processing, the control software 302 extracts the external document reference information included in a document and analyzes the extracted information. Then the control software 302 notifies the image decoder 303 of the location where the image source 308 is stored and the format of the image source 308, via the control bus 304. Further, the control software 302 notifies information on the moving image path 111 for the image decoder 303 to output the image source 308 and the image source input path 309 to be used for downloading of the image source 308. Assuming that multiple image sources 308 exist, the control software 302 performs moving image data input processing for all the image sources 308 necessary for display of the composite image data 109. Further, the moving image path 111 may be single or multiple paths.

If the image source 308 is a compressed image, the image decoder 303 decodes the image source 308, and outputs non-compressed image data to the moving image path 111 designated by the control software 302. Further, if the image source 308 is non-compressed image data, the image decoder 303 outputs the image source 308 to the moving image path 111 designated by the control software 302 without decoding the image source 308. By the above processing, the moving image data 105 (FIG. 1) corresponding to the moving image path 111 is generated.

(1-2) Drawing Command Generation Processing

Regarding the drawing command generation processing performed by the image processing system 300, mainly the operation of the control software 302 will be described.

The control software 302 refers to a document received from the application 301 to search for a description on drawing of a moving image. Next, the control software 302 substitutes external document reference information included in a section related to the moving image with information on the moving image path 111. The control software 302 generates the drawing command 104 including a moving image drawing description where route information has been substituted and a graphics drawing description, and outputs the generated drawing command 104 to the drawing command path 110. Note that the details of the drawing command 104 will be described later.

(2) Operation of Image Processing Apparatus 100

Next, the operation of the image processing apparatus 100 will be described. First, (2-1) definition of input/output, and (2-2) operation will be described.

(2-1) Definition of Input/Output

In FIG. 1, the image processing apparatus 100 receives the drawing command 104 and the moving image data 105 as inputs. Further, the image processing apparatus 100 generates the composite image data 109 as an output.

(2-1-1) Definition of Drawing Command

The drawing command 104 allows a display of animation graphics as typified by SVG or flash memory and a moving image. The drawing command 104 generally includes a graphics drawing tag, a moving image tag and a drawing completion tag.

(2-1-1-1) Graphics Drawing Tag

The graphics drawing tag includes graphics element definitions such as text, basic figure, path information and link information, a drawing instruction for, for example, animation, and a parameter group necessary upon drawing in drawing instruction of respective graphics elements. As binding between these graphics elements constituting the graphics drawing tag and the drawing instruction and parameter group necessary for the drawing instruction is well known as a general technique, the binding will not be described in detail here.

(2-1-1-2) Moving Image Tag

The moving image tag has moving image base point coordinate information, size information, moving image drawing instruction information applied to the moving image, and designation information of the moving image path 111 used upon input of non-compressed moving image data 105 into the image processing apparatus 100. In addition, the property of the moving image necessary in the moving image drawing processing to be described later may be included in the moving image tag. For example, if the image processing apparatus 100 performs color conversion on the moving image, color space information of the moving image is added to the tag.

(2-1-1-3) Drawing Completion Tag

The drawing completion tag is used for notification of the completion of a drawing sequence.

(2-1-2) Definition of Input Moving Image

The moving image data 105 is non-compressed data obtained by decoding an airwave of television broadcast, a video input signal or the like. Generally the shape of a moving image is rectangular, however, the shape of input moving image does not impose any limitation on the present invention.

(2-1-3) Definition of Composite Image Data 109

The composite image data 109 is a result of composition between graphics data and moving image data. The composite image data 109 has raster format color information.

Next, the operation of the drawing control unit 101 according to the first embodiment will be described using the flowchart of FIG. 4.

Figure 4:
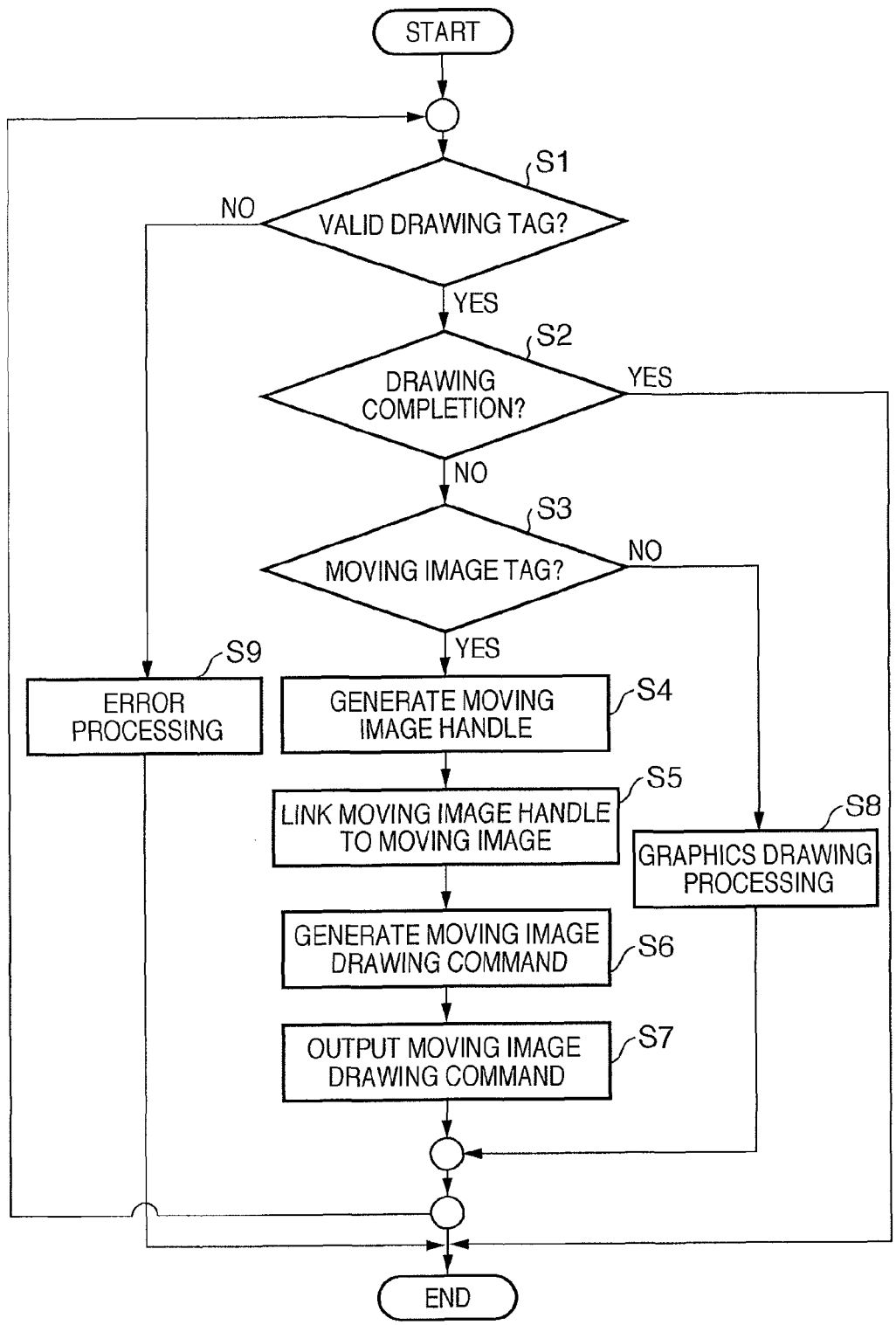
FIG. 4 is a flowchart describing processing by the drawing control unit according to the first embodiment.

FIG. 4 is a flowchart describing processing by the drawing control unit 101 according to the first embodiment.

The drawing command separation unit 201 receives the drawing command 104, analyzes the drawing command 104 and detects a tag. In step S1, it is determined whether or not the detected tag is a valid tag. If it is determined in step S1 that the tag is not a valid tag, the process proceeds to step S9, in which error processing is performed and the process ends. Note that various processings may be performed as the content of the error processing, however, as such processings are not related to the subject matter of the present invention, the processings will not be described in detail here. Further, in the first embodiment, an example of the sequence where the process is interrupted after the error processing is shown. However, the process may be restored at some recovery processing.

On the other hand, if it is determined in step S1 that the detected tag is a valid drawing tag, the process proceeds to step S2, in which it is determined whether or not the tag is a drawing completion tag. If it is determined in step S2 that the tag is a drawing completion tag, the process ends. If it is determined in step S2 that the tag is not a drawing completion tag, the process proceeds to step S3, in which it is determined whether or not the tag is a moving image tag. If it is determined in step S3 that the tag is a moving image tag, the process proceeds to step S4, in which moving image drawing command generation processing is performed. On the other hand, if it is determined in step S3 that the tag is not a moving image tag, it is determined that the tag is a graphics drawing tag. The process proceeds to step S8, in which graphic drawing processing is performed.

Next, the moving image drawing command generation processing shown in steps S4 to S7 will be described.

When the drawing command separation unit 201 detects this moving image tag, the drawing command separation unit 201 generates a moving image handle in step S4. In the first embodiment, the moving image handle is generated by designating a width, a height of an input moving image, image quality information of the moving image after conversion and default transparency. Note that types of parameters delivered to the moving image handle do not impose any limitation on the present invention. Further, in the first embodiment, the Z-order of the moving image handle and the graphics data is defined with a drawing order, however, the Z-order may be explicitly designated in the moving image handle. The image quality information has quality information to determine the priorities of image quality and speed upon moving image reproduction. As the default transparency of the moving image, transparency is designated with respect to a moving image without transparency. When the moving image data 105 inputted into the image processing apparatus 100 has transparency, the transparency of the moving image data 105 may be used in a final output.

Next, in step S5, the drawing command separation unit 201 links the moving image handle generated in step S4 to the moving image path 111. Next, in step S6, the drawing command separation unit 201 generates a moving image drawing command for the moving image handle linked to the moving image path 111 in step S5. The moving image drawing command includes a designation of a moving image handle as the subject of moving image drawing command generation, and a designation of rotation, scaling, moving, masking, clipping, trapezoidal conversion, color conversion, filter processing of the moving image, and includes an instruction for moving image reproduction processing. Further, the moving image drawing command includes a designation of parameter group necessary for the processing. In the designation of the parameters, affine transformation matrix elements are designated for rotation, scaling and the like, color conversion matrix is designated for color conversion, a filter type is designated for filter processing, and a mask pattern is designated or a LUT is set for masking. Since the link among these moving image drawing instruction, moving image handle drawing instruction, and the parameter group necessary for the drawing instruction is well known as a general technique, the link will not be described in detail here. Note that particular moving image processing designated upon generation of moving image drawing command and its parameter group, and the link therebetween do not impose any limitation on the present invention. Then the process proceeds to step S7, in which these set values are output as the moving image drawing command 106.

(2-2-1-2) Graphics Drawing Processing

Hereinbelow, graphics drawing processing in step S8 will be described.

When the drawing command separation unit 201 detects the graphics drawing tag, the drawing command separation unit 201 analyzes the tag and generates the graphics drawing command 204. The graphics drawing command 204 is sent to the graphics drawing unit 202, and actual drawing is performed. Note that as a drawing algorithm used in the graphics drawing unit 202, generally known various methods such as Painter's algorithm are applicable. Further, as the graphics drawing command 204, commands in various formats appropriate to the above-described drawing algorithm are applicable. The drawing algorithm and the format of the graphics drawing command do not impose any limitation on the scope of the present invention.

The graphics drawing unit 202 draws graphics data in accordance with the input graphics drawing command 204, and outputs a generated raster image to the graphics storage unit 203. The generated raster image may include transparency, Z-order and the like in addition to the color information by pixel. Further, the raster image may include an area where an image does not actually exist, or the raster image may be an output limited to a rectangular area where an image exists. In the former case, the transparency in the area where an image does not exist is set with complete transparency, while in the latter case, area information (starting coordinates in final output coordinate system, width and height of the area and the like) may be added to the output image. The graphics storage unit 203 holds the output image data.

Note that in the present embodiment, the graphics storage unit 203 may have multiple storage areas corresponding to the Z-order of the result of graphics drawing. In this case, the graphics storage unit 203 stores the drawing result outputted from the graphics drawing command 204 in different storage areas based on the Z-order. As such technique of divided storage by plane is well known, the technique will not be described in detail here.

(2-2-2) Operation of Moving Image Drawing Unit 102

The moving image drawing unit 102 analyzes the moving image drawing command 106 outputted from the drawing command separation unit 201 and specifies the moving image path 111 as the subject of processing. Next, the moving image drawing unit 102 performs designated conversion on the moving image data 105 inputted through the specified moving image path 111, and outputs the processed moving image data 108. The processed moving image data 108 is a raster image which may include transparency, Z-order and the like in addition to color information. Further, the raster image may include an area where an image does not actually exist, or the raster image may be an output limited to a rectangular area where an image exists. In the former case, the transparency in the area where an image does not exist is set with complete transparency, while in the latter case, area information (starting coordinates in final output coordinate system, width and height of the area and the like) may be added to the output image. Note that the moving image drawing unit 102 may one-to-one correspond to physically plural moving image paths 111, otherwise, the moving image drawing unit 102 may correspond to physically one moving image path 111 having time-divisionally provided plural logical paths.

(2-2-3) Operation of Composition Unit 103

The composition unit 103 composes the processed moving image data 108 with the graphics data 107 thereby generates the composite image data 109 and outputs the composite data. As a composition method used here, various methods such as general sequential composition by pixel in the Z-order are applicable.

As described above, according to the first embodiment, it is possible to perform rendering on moving image data and graphics data and compose these data in a unified manner.

Second Embodiment

Hereinbelow, a second embodiment of the present invention will be described with reference to the attached drawings. Note that elements having the same functions as those of the above-described elements have the same reference numerals and explanations of the elements will be omitted.

Figure 5:
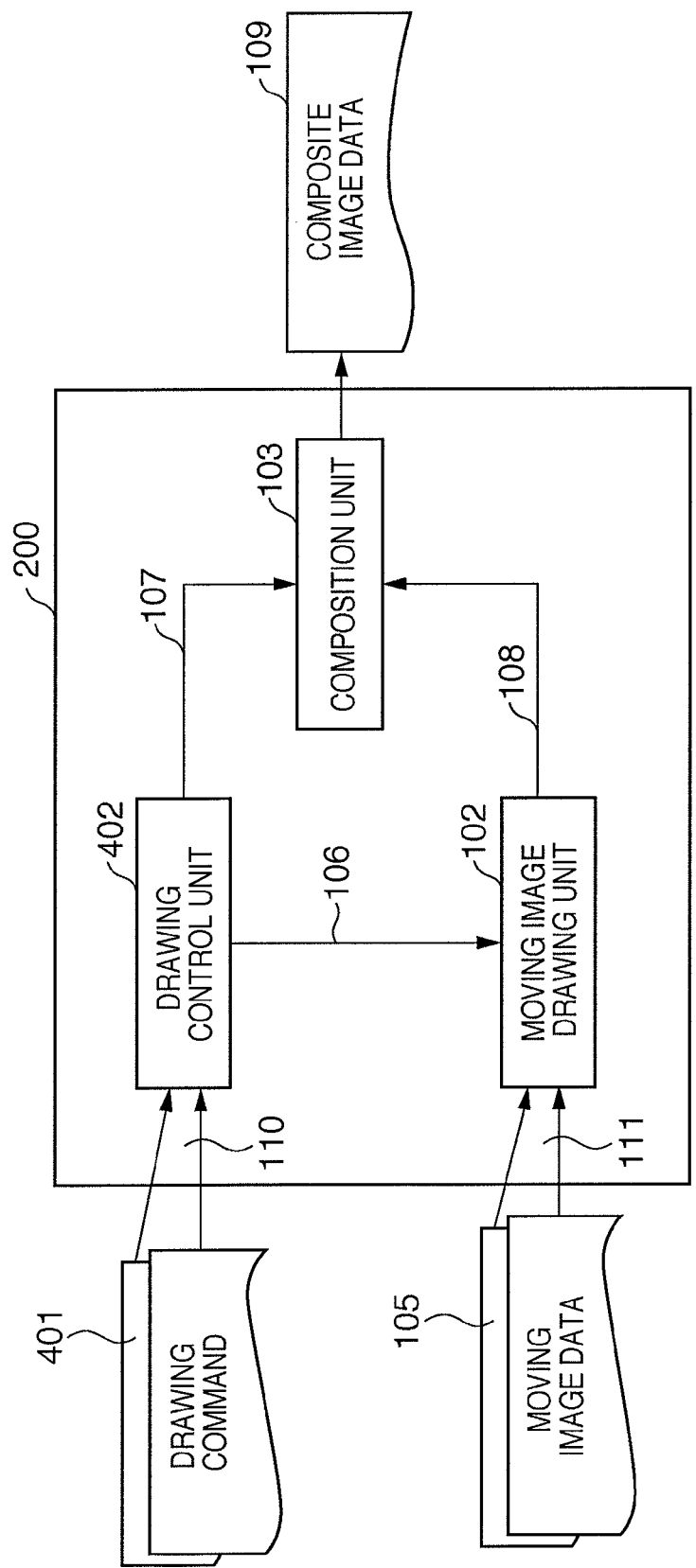
FIG. 5 is a block diagram describing a configuration of the image processing apparatus according to an exemplary second embodiment of the present invention.

FIG. 5 is a block diagram describing a configuration of an image processing apparatus 200 according to the second embodiment of the present invention.

In FIG. 5, a drawing control unit 402 receives multiple drawing commands 401, generated based on plural drawing contexts, via the drawing command paths 110 in parallel, processes them and outputs a moving image drawing command 106. Further, the drawing control unit 402 performs graphics drawing and generates the graphics data 107. The drawing context indicates a concept independently one-to-one defined with respect to a subject to perform drawing using the context. Generally, different threads or different processes respectively have one drawing context.

Figure 6:
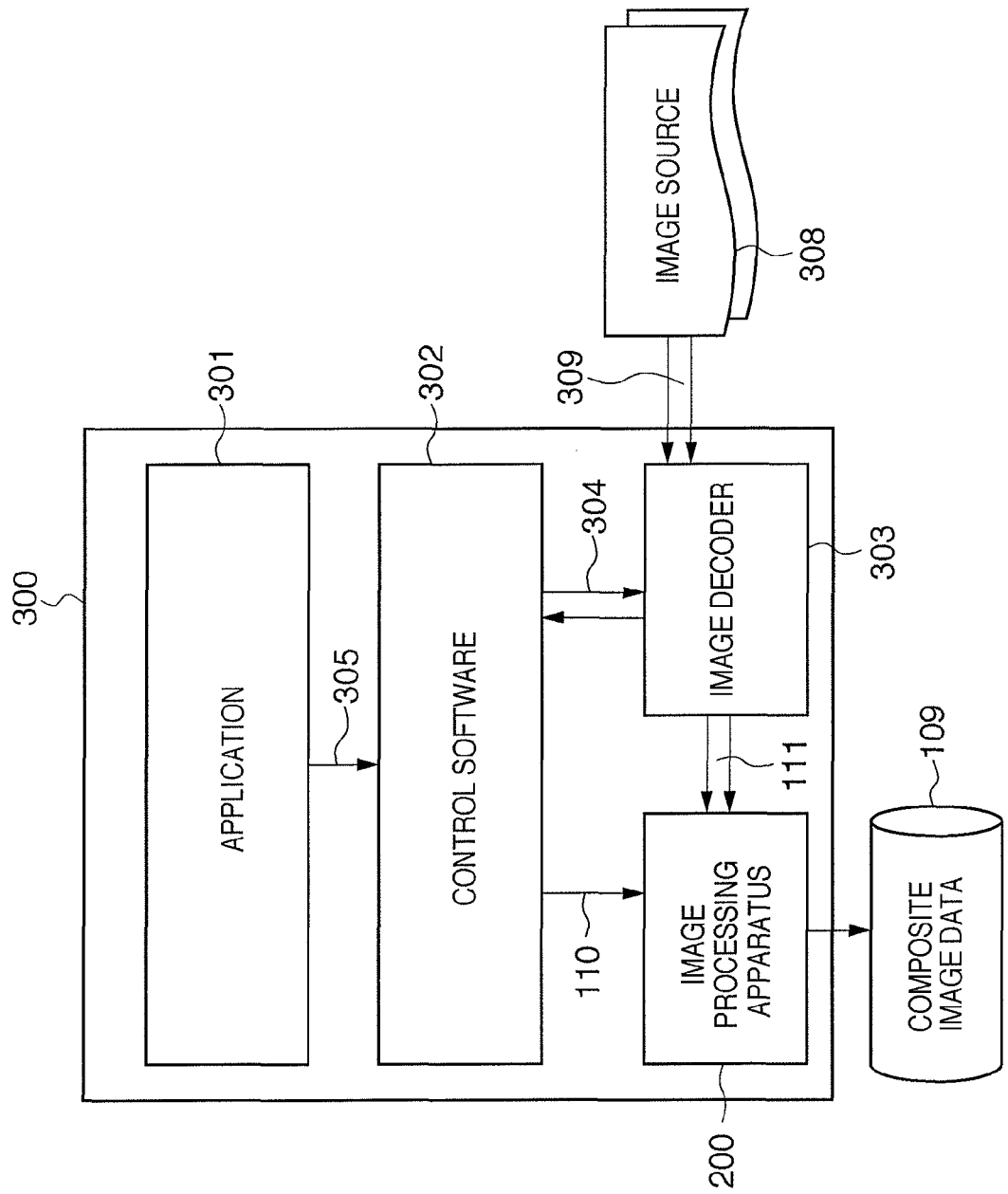
FIG. 6 is a block diagram describing a configuration of the image processing system using the image processing apparatus according to the second embodiment.

FIG. 6 is a block diagram describing a configuration of the image processing system 300 using the image processing apparatus 200 according to the second embodiment. In FIG. 6, elements corresponding to those in FIG. 3 described in the above first embodiment have the same reference numerals and explanations of the elements will be omitted. As it is apparent in FIG. 6, the constituent elements of the image processing system according to the second embodiment are the same as those according to the above-described first embodiment except the image processing apparatus 200. Note that as the second embodiment will be described on the presumption that the drawing command 401 has multiple drawing contexts, the application 301 or the control software 302 are divided into multiple independent threads or processes.

Next, the operation of the image processing apparatus 200 will be described. As it is apparent in FIG. 5, as particular elements of the second embodiment are the drawing command 401 and the drawing control unit 402, these elements will be described here.

(3-1) Definition of Drawing Command 401

The basic structure of the drawing command 401 used in the second embodiment is the same as that of the drawing command 104 in the above-described first embodiment. The difference is that there is a Global Z-order tag 701 (FIG. 7) for designation of the Z-order of all the drawing contexts. The Global Z-order tag 701 is uniquely determined by the application 301 and the control software 302 among different drawing contexts. A Z-order in a final coordinate system of graphics data and moving image data belonging to some drawing context is determined by a combination between a Local Z-order 702 (FIG. 7) in the drawing context and the Global Z-order 701.

Figure 7:
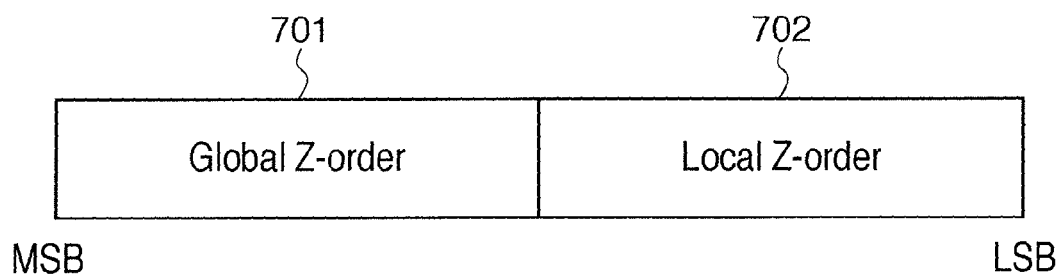
FIG. 7 is a diagram illustrating an example of a structure of Z-order according to the second embodiment of the present invention.

FIG. 7 is a diagram illustrating an example of the structure of the Z-order according to the second embodiment of the present invention.

In FIG. 7, as it is apparent from the Global Z-order 701 set to the MSB side, the drawing context defines one drawing layer.

(3-2) Operation of Drawing Control Unit 402

Figure 8:
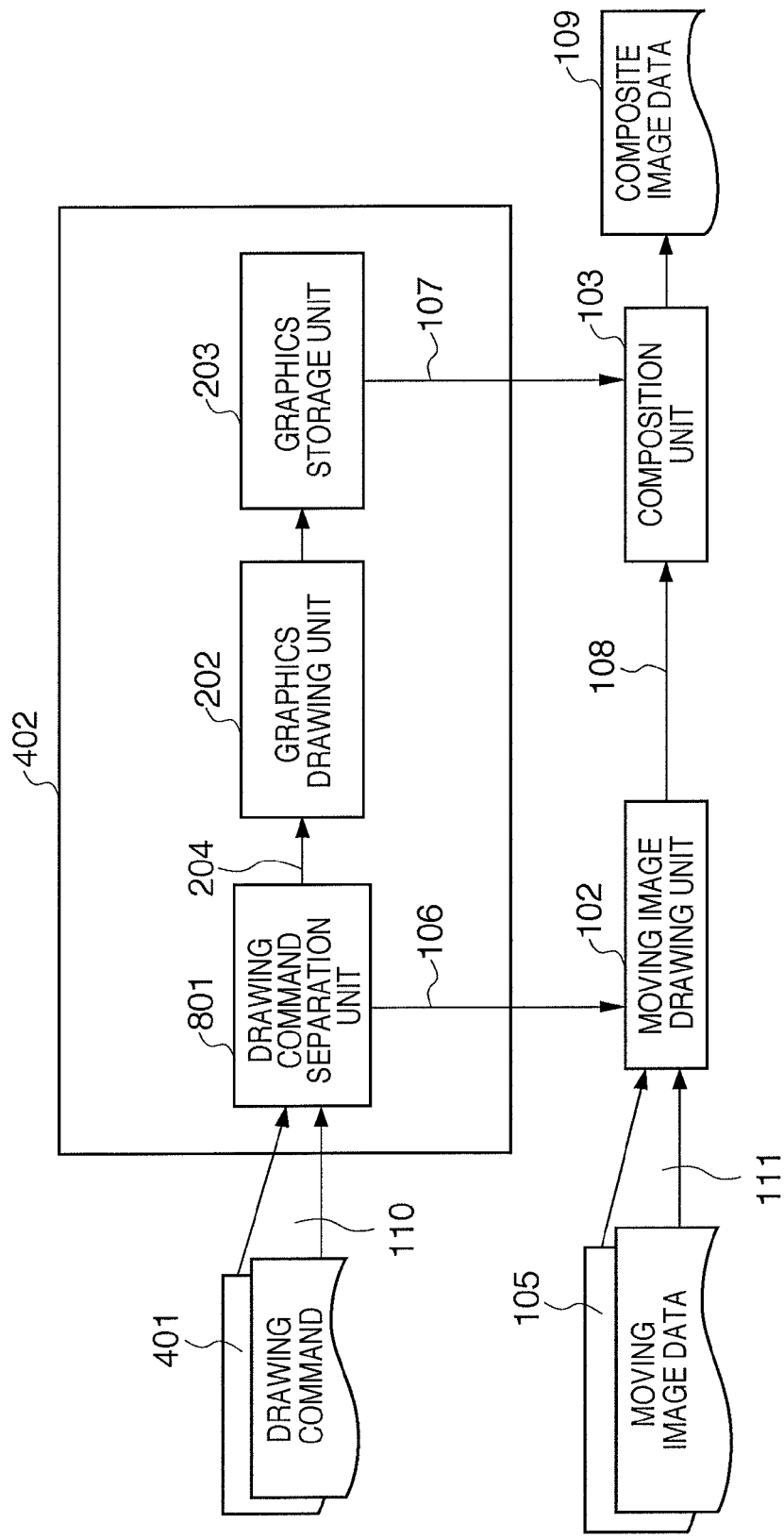
FIG. 8 is a block diagram describing a functional configuration of the drawing control unit according to the second embodiment.

The configuration of the drawing control unit 402 according to the second embodiment is shown in FIG. 8.

FIG. 8 is a block diagram describing the functional configuration of the drawing control unit 402 according to the second embodiment. In FIG. 8, elements corresponding to those in FIG. 2 according to the above-described first embodiment have the same reference numerals, and explanations of the elements will be omitted.

In FIG. 8, a drawing command separation unit 801 generates a graphics drawing command 204 and the moving image drawing command 106 based on drawing commands 401 generated from multiple drawing contexts. As other operations are the same as those in the above-described FIG. 2, explanations of these operations will be omitted.

Next, the operation of the drawing control unit 402 according to the second embodiment will be described using the flowchart of FIGS. 9A and 9B.

Figure 9A:
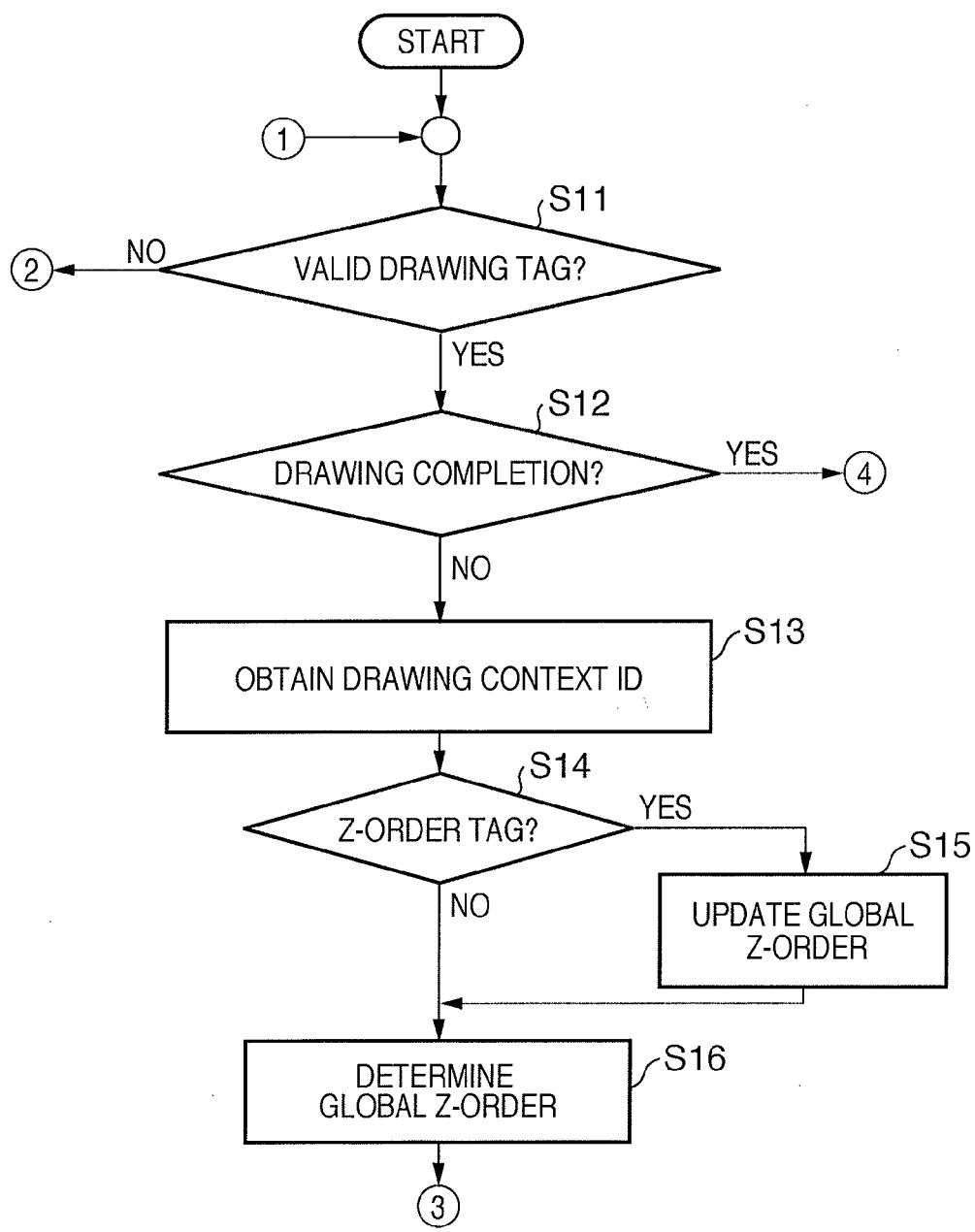
FIGS. 9A and 9B are flowcharts describing the processing by the drawing control unit according to the second embodiment.
Figure 9B:
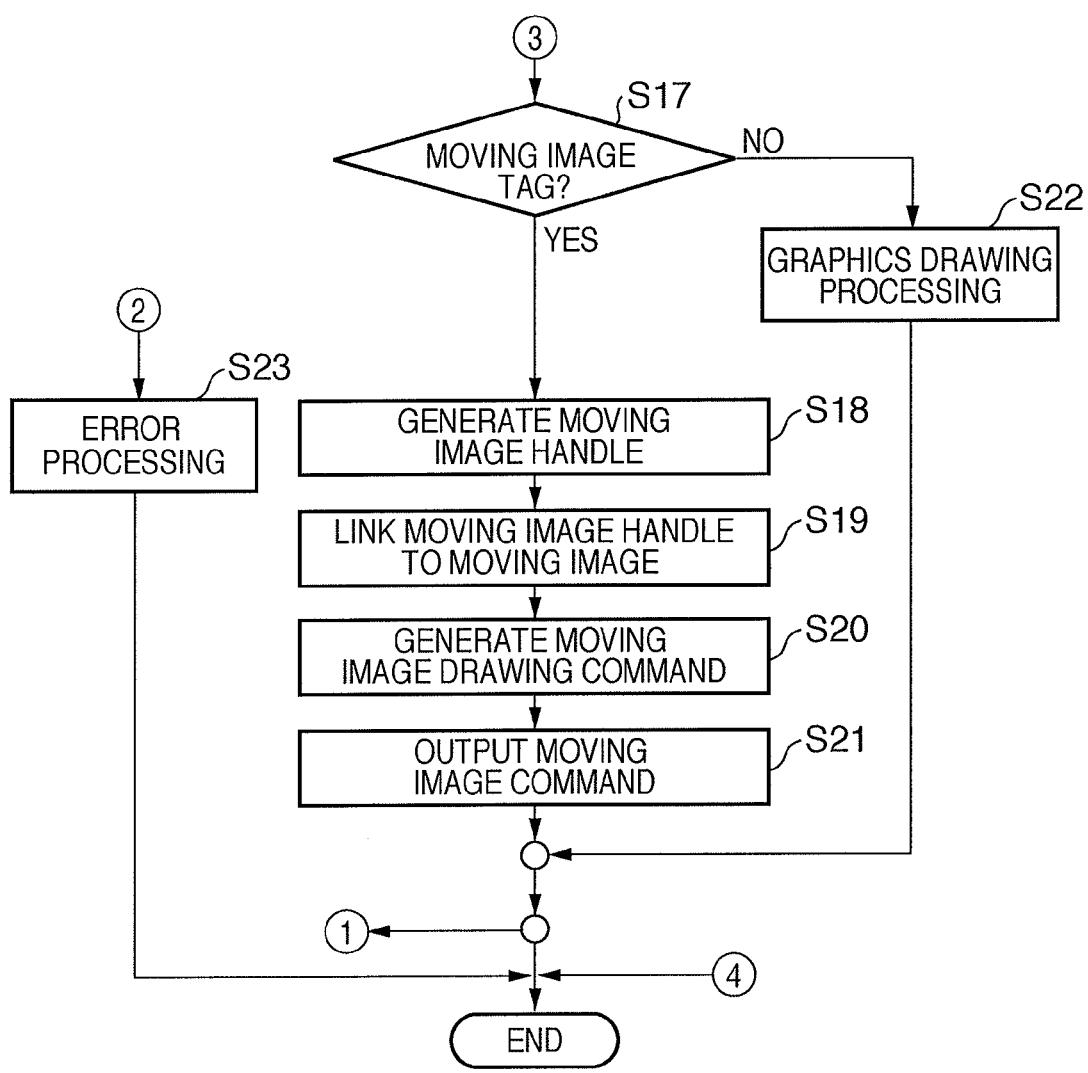

FIGS. 9A and 9B are flowcharts describing the processing by the drawing control unit 402 according to the second embodiment. Note that in FIGS. 9A and 9B, steps S11, S12 and S17 to S23 correspond to steps S1, S2, S3 to S9 in FIG. 4.

The drawing command separation unit 801 receives the drawing commands 401, and performs processings in steps S11 and S12. Then the process proceeds to S13, in which IDs of the respective drawing contexts are obtained. As described above, as the respective drawing contexts belong to different processes or threads, a unique ID corresponding to each drawing context can be defined by obtaining a process ID or thread ID. Next, in step S14, it is determined whether or not the drawing tag is the Global Z-order tag 701. If it is determined that the drawing tag is the Global Z-order tag 701, then the process proceeds to step S15, in which the value of the Global Z-order corresponding to the above-described drawing context ID is updated. The correspondence between the drawing context ID and the Global Z-order is held as a table.

On the other hand, if it is determined in step S14 that the drawing tag is not the Global Z-order tag 701, or if the processing in step S15 has been performed, the process proceeds to step S16, in which the above-described table is searched and the Global Z-order corresponding to the drawing context ID is determined. Then the process proceeds to step S17 (FIG. 9B).

In step S17, it is determined whether or not the drawing tag is a moving image tag. If it is determined that the drawing tag is a moving image tag, then the process proceeds to step S18, in which a moving image drawing command is generated. On the other hand, if it is determined in step S17 that the drawing tag is not a moving image tag, it is determined that the drawing tag is a graphics drawing tag, then the process proceeds to step S22, in which graphics drawing processing is performed. The difference between this step S22 and step S8 in FIG. 4 is that the Z-order shown in FIG. 7 is used as described above. Note that the graphics storage unit 203 in the second embodiment has a structure on the presumption that it has different data storage areas based on the Z-order. This structure has already been described in the first embodiment, however, the feature of the second embodiment is that upon allocation by Z-order, the Global Z-order is extracted and used.

When the drawing command separation unit 801 has detected a moving image tag, the drawing command separation unit 801 generates a moving image handle in step S18. In the second embodiment, the difference from the above-described first embodiment is that as the value of the Z-order set in the moving image handle, a value in FIG. 7 generated by combining the above-described Global Z-order and Local Z-order. The Local Z-order is the same as that defined in the above-described first embodiment.

Next, in step S19, the drawing command separation unit 801 links the moving image handle generated in step S18 to the moving image path 111. Next, in step S20, the drawing command separation unit 801 generates a moving image drawing command for the moving image handle linked to the moving image path 111 in step S19. The moving image drawing command generation includes a designation of a moving image handle as the subject of moving image drawing command generation, and a designation of rotation, scaling, moving, masking, clipping, trapezoidal conversion, color conversion, filter processing of the moving image, and an instruction for moving image reproduction processing. Further, the moving image drawing command includes a designation of parameter group necessary for the processing. In the designation of the parameters, affine transformation matrix elements are designated for rotation, scaling and the like, a color conversion matrix is designated for color conversion, a filter type is designated for filter processing, and a mask pattern is designated or a LUT is set for masking. Since the link among these moving image drawing instruction, moving image handle drawing instruction, and the parameter group necessary for the drawing instruction is well known as a general technique, the binding will not be described in detail here. Note that particular moving image processing designated upon generation of moving image drawing command and its parameter group, and the link therebetween do not impose any limitation on the present invention. Then the process proceeds to step S21, in which these set values are outputted as the moving image drawing command 106.

As described above, according to the second embodiment, it is possible to execute multiple drawing commands in parallel and improve the processing speed.

Third Embodiment

Figure 10:
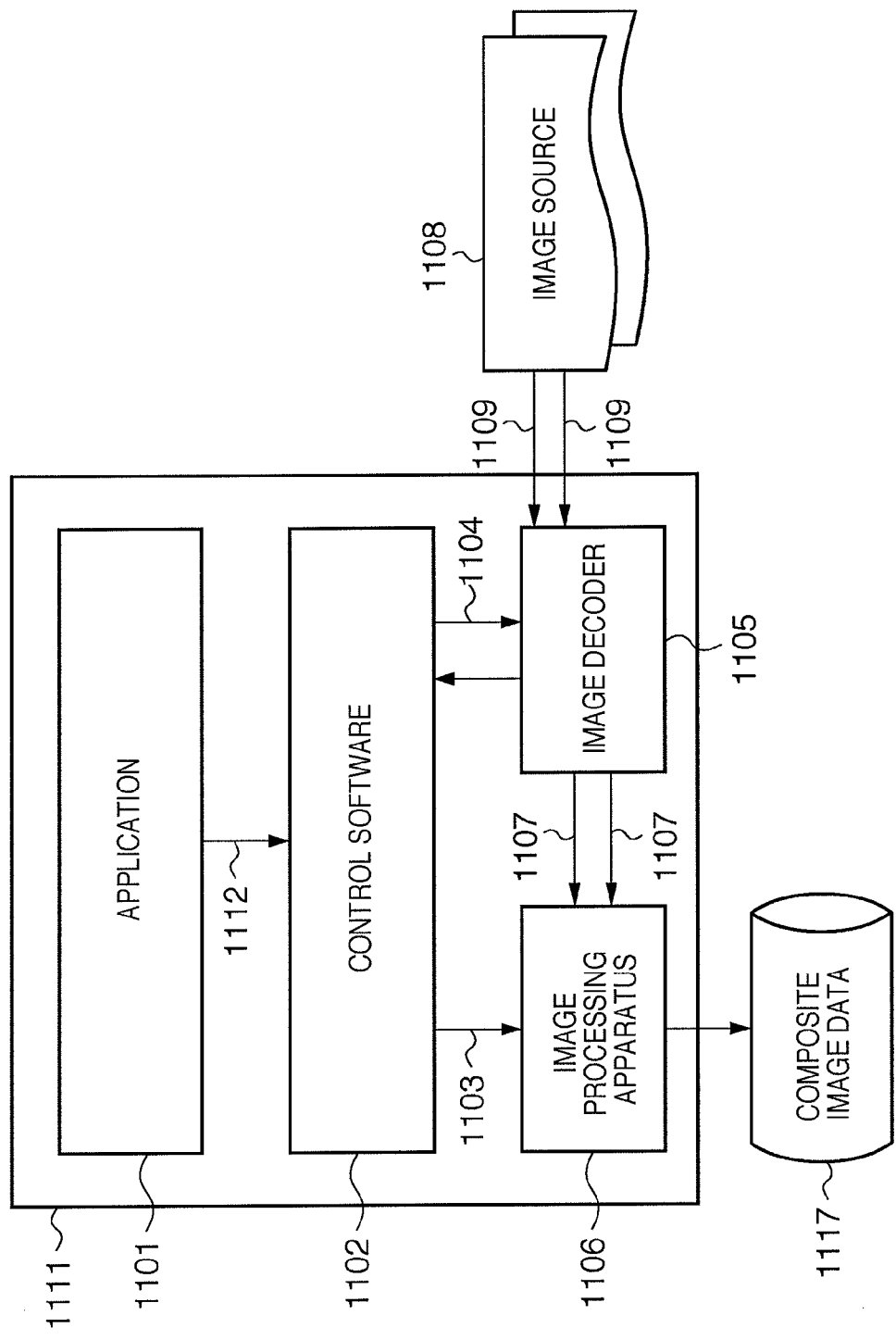
FIG. 10 is a block diagram describing a configuration of the image processing system having the image processing apparatus according to a third embodiment of the present invention.

FIG. 10 is a block diagram describing a configuration of an image processing system 1111 having an image processing apparatus 1106 according to a third embodiment of the present invention.

The image processing system 1111 has an application 1101, control software 1102, the image processing apparatus 1106 and an image decoder 1105. The control software 1102 receives a document generated by the application 1101 via a document path 1112 and delivers the document to the image processing apparatus 1106. Note that the document includes an image drawing instruction and external document reference information as typified by URI information. An image source 1108 is supplied via an image source input path 1109 to the image decoder 1105. The image source input path 1109 may be physically single or plural paths. Further, it may be arranged such that plural image sources are inputted by time-divisionally using physically single image source input path 1109.

Next, the moving image input processing performed by the control software 1102 will be described.

As the moving image input processing, the control software 1102 extracts the external document reference information included in the document and analyzes the extracted information. Then the control software 1102 notifies the image decoder 1105 of the location where the image source 1108 is stored and the format of the image source 1108, via the control bus 1104. Further, the control software 1102 notifies the image decoder 1105 of information on the moving image path 1107 for the image decoder 1105 to output the image data and the image source input path 1109 to be used for downloading of the image source 1108. Assuming that multiple image sources 1108 exist, the control software 1102 instructs the image decoder 1105 to input the moving image for all the image sources 1108 necessary for display of composite image data 1117. Note that the moving image path 1107 for output by the image decoder 1105 may be single or plural paths.

If the image source 1108 is a compressed image, the image decoder 1105 decodes (expands) the image source 1108, and outputs the decoded data to the moving image path 1107. On the other hand, if the image source 1108 is non-compressed image data, the image decoder 1105 outputs the image source 1108 to the moving image path 1107 designated by the control software 1102 without decoding the image source 1108. The control software 1102 substitutes external document reference information included in the document received from the application 1101 with information on the moving image path 1107. Further, the image processing apparatus 1106 uses a drawing command generated by substituting the external document reference information included in the document with the moving image path 1107 by the above-described processing.

Figure 11:
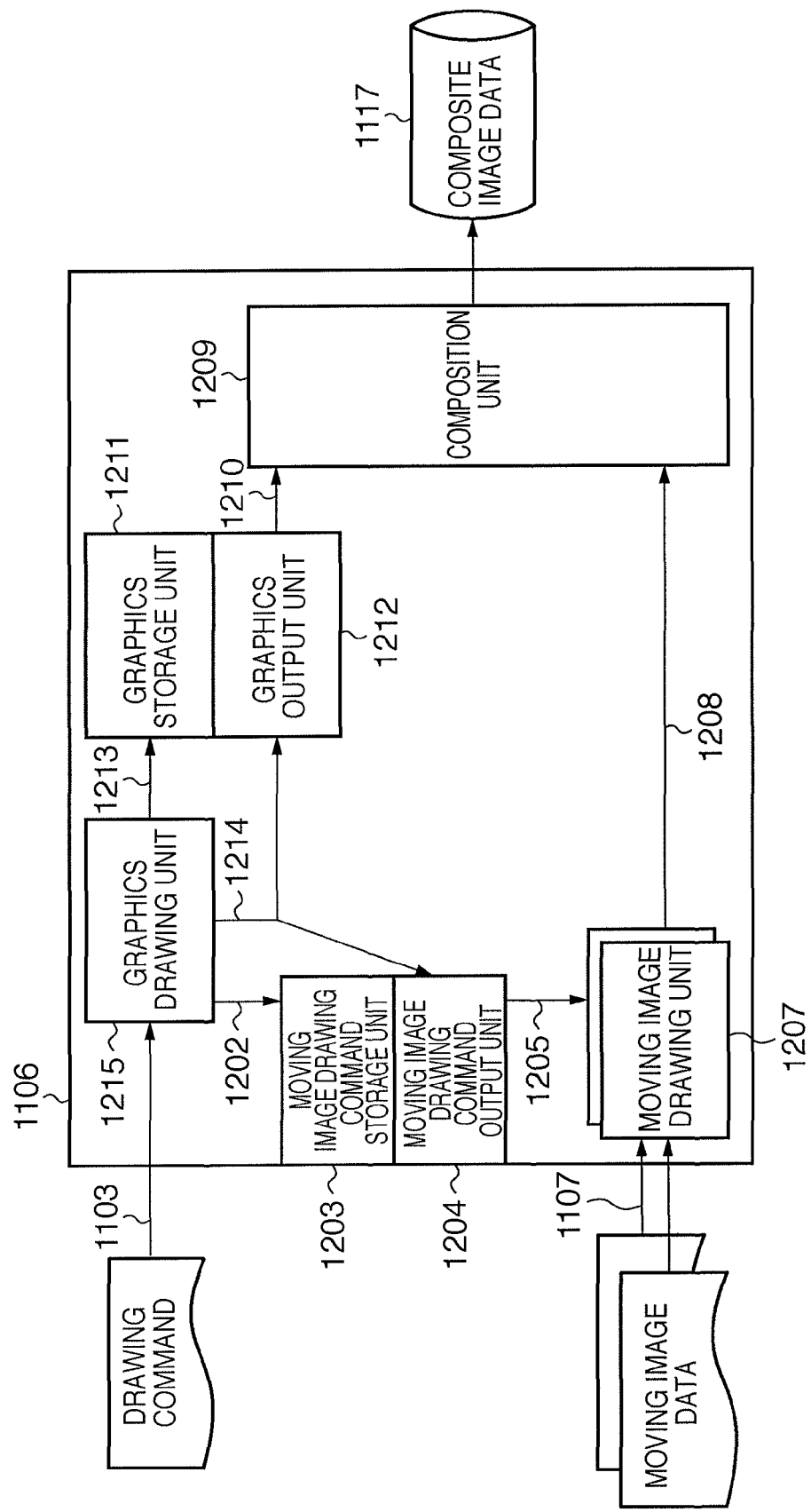
FIG. 11 is a block diagram describing a functional configuration of the image processing apparatus according to the third embodiment.

FIG. 11 is a block diagram describing a functional configuration of the image processing apparatus 1106 according to the third embodiment of the present invention. Note that in FIG. 11, elements corresponding to those in FIG. 10 have the same reference numerals and explanations of the elements will be omitted.

The image processing apparatus 1106 receives a drawing command and moving image data respectively via a drawing command path 1103 and the moving image path 1107, and generates composite image data 1117 by composing the drawing command with the moving image. The drawing command, including the moving image drawing command and graphics drawing command, allows a display of animation graphics as typified by SVG or flash memory and a moving image. The drawing command includes a graphics drawing tag and a moving image tag.

The graphics drawing tag includes a graphics drawing tag for designation of text, basic figure, path information and link information, animation, screen update instruction and the like, and a parameter group necessary upon drawing in drawing instruction of respective graphics elements. As link between these graphics drawing tag and the drawing instruction for graphic elements and the parameter group necessary in the drawing instruction is well known as a general technique, the link will not be described in detail here.

Further, the moving image tag has moving image basepoint coordinate information, size information, moving image drawing instruction information applied to the moving image, and designation information of the moving image path 1107 used upon input of a non-compressed moving image stream into the image processing apparatus 1106. In addition, the property of the moving image necessary in the moving image drawing processing to be described later may be included in the moving image tag. For example, when the image processing apparatus 1106 performs color conversion in the moving image, color space information of the moving image is added to the tag. Note that the moving image is non-compressed data obtained by decoding an airwave of television broadcast, a video input signal or the like. Generally the shape of a moving image is rectangular, however, the shape of an input moving image does not impose any limitation on the present invention.

The composite image data 1117 is a result of composition between graphics data and moving image data. The composite image data 1117 has raster format color information.

The image processing apparatus 1106 according to the third embodiment has a graphics drawing unit 1215, a moving image drawing command storage unit 1203, a moving image drawing command output unit 1204, a graphics storage unit 1211, a graphics output unit 1212, a moving image drawing unit 1207 and a composition unit 1209.

Next, processing by the image processing apparatus 1106 having the above configuration will be described.

The graphics drawing unit 1215 receives a drawing command via the drawing command path 1103, and outputs the moving image drawing command, synchronizing information and drawn graphics data to a moving image drawing command path 1202, a synchronizing information path 1214 and a graphics path 1213. Note that in the following description, graphics data as a result of drawing will be simply referred to as graphics data.

Next, a procedure by the graphics drawing unit 1215 to generate the moving image drawing command and graphics data to be outputted to the moving image drawing command path 1202 and the graphics path 1213, based on graphics drawing tag and moving image tag inputted as a drawing command, will be described. A synchronizing moving image drawing command path 1205 supplies a moving image drawing command to the moving image drawing unit 1207. The processed moving image path 1208 supplies a moving image drawn by the moving image drawing unit 1207 to the composition unit 1209. A synchronized graphics path 1210 supplies the graphics data from the graphics output unit 1212 to the composition unit 1209 in synchronization with the moving image.

Figure 12:
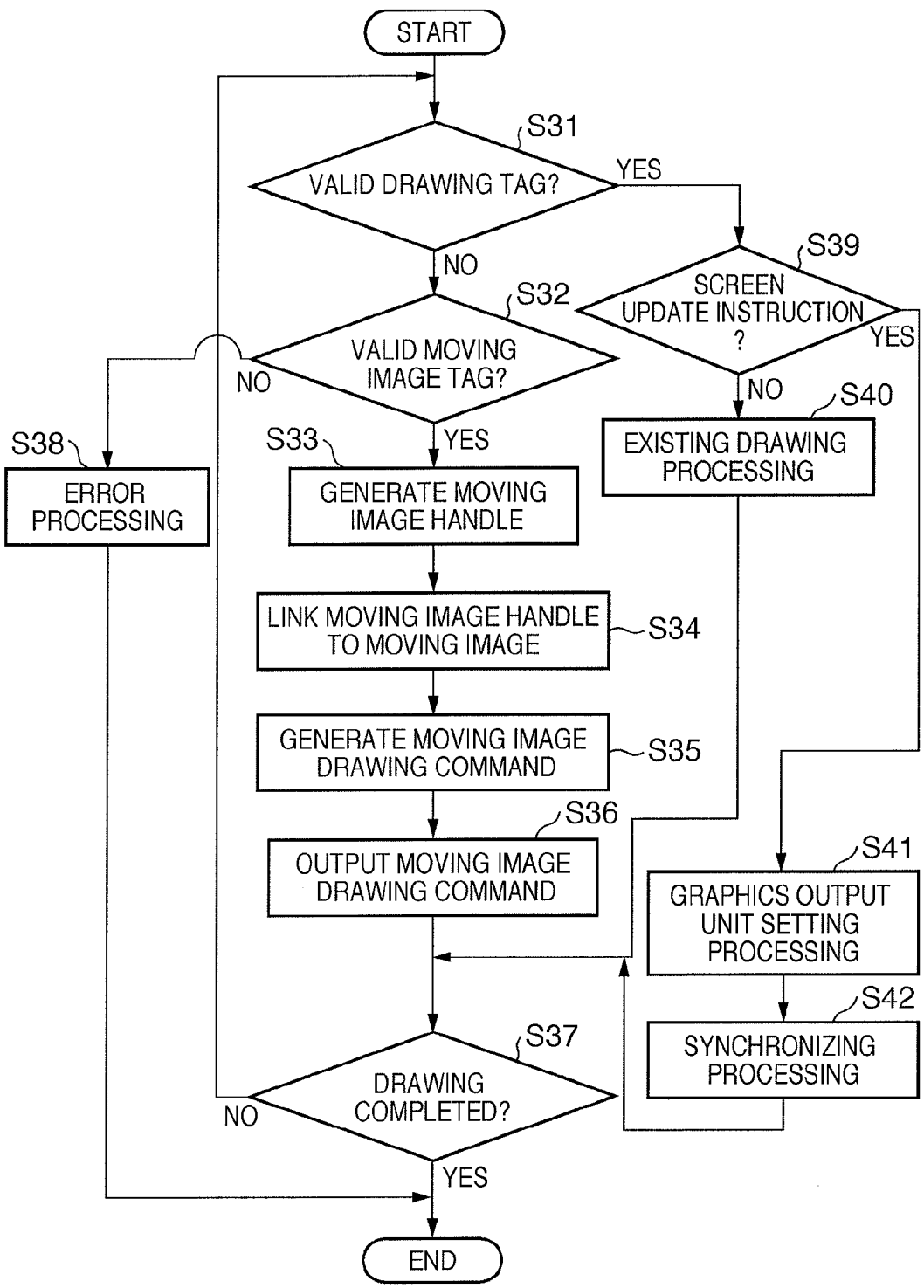
FIG. 12 is a flowchart describing processing by a graphics drawing unit in the image processing apparatus according to the third embodiment.

FIG. 12 is a flowchart describing processing by the graphics drawing unit 1215 in the image processing apparatus 1106 according to the third embodiment. The figure shows a procedure of inputting a drawing command, and generating graphics data and moving image drawing command based on the drawing command.

This processing is launched by receiving the drawing command via the drawing command path 1103. First, in step S31, it is determined whether or not the graphics drawing tag of the drawing command is a valid drawing tag. If it is determined that the graphics drawing tag is a valid drawing tag, the process proceeds to step S39. In step S39, it is determined whether or not the graphics drawing tag is a screen update instruction. If it is determined that the graphics drawing tag is not the screen update instruction, the process proceeds to step S40, in which drawing of a designated graphic object is performed, and the generated graphics data is outputted to the graphics path 1213. Then the process proceeds to step S37. Note that the graphics drawing may be performed using a known method such as Painter's algorithm.

Figure 13:
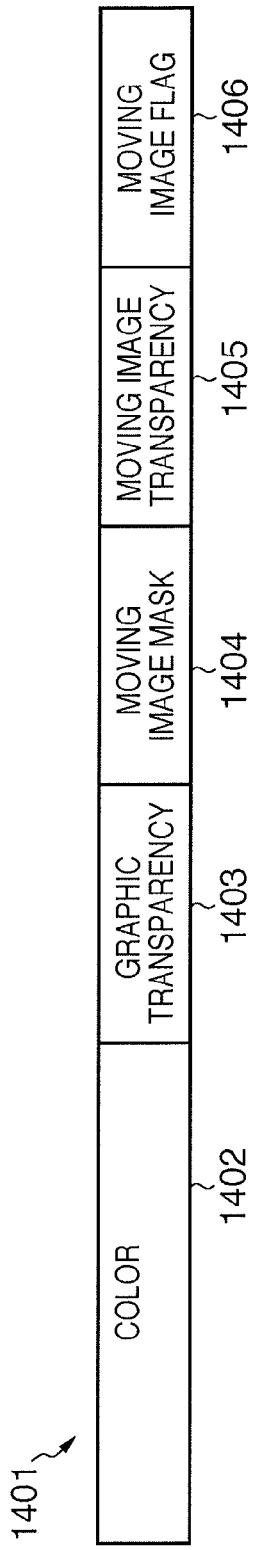
FIG. 13 is a diagram illustrating an example of graphics data generated by the graphics drawing unit according to the third embodiment.

FIG. 13 is a diagram describing an example of graphics data generated by the graphics drawing unit 1215 according to the third embodiment.

Graphics data 1401 includes color information 1402 indicating the color of the graphics data, graphic transparency 1403 indicating the transparency of the graphics data, a moving image mask 1404 indicating a moving image display area, and moving image transparency 1405 indicating default transparency of the moving image. Further, the graphics data 1401 has a moving image flag 1406 indicating whether or not moving image display is necessary for each pixel of the graphics data.

On the other hand, if it is determined in step S39 that the drawing tag is the screen update instruction, the process proceeds to step S41, in which the graphics drawing unit 1215 performs output setting for the graphics output unit 1212 and the moving image drawing command output unit 1204. Note that the screen update instruction may be issued upon completion of output for one frame, or upon completion of drawing of a partial area in the frame.

The details of the processing in step S41 are as follows.

The graphics drawing unit 1215 designates the size of the graphics data stored in the graphics storage unit 1211 for the graphics output unit 1212. Further, the graphics drawing unit 1215 designates address information indicating the area of the graphics storage unit 1211 where the series of graphics data drawn at previous processing in step S42 or after the drawing processing in step S40 is stored. Note that if the graphics storage unit 1211 is a register, the designation of address information is not necessary.

Further, the graphics drawing unit 1215 designates the size of moving image drawing command stored in the moving image drawing command storage unit 1203 for the moving image drawing command output unit 1204. Further, the graphics drawing unit 1215 designates address information indicating the area of the moving image drawing command storage unit 1203 where the moving image drawing command generated by previous processing in step S42 or the drawing processing in step S40 is stored. Note that if the moving image drawing command storage unit 1203 is a register, the designation of address information is not necessary.

Then, the process proceeds from step S41 to step S42, in which the graphics drawing unit 1215 outputs synchronizing information via the synchronizing information path 1214 to the graphics output unit 1212 and the moving image drawing command output unit 1204.

Figure 14B:
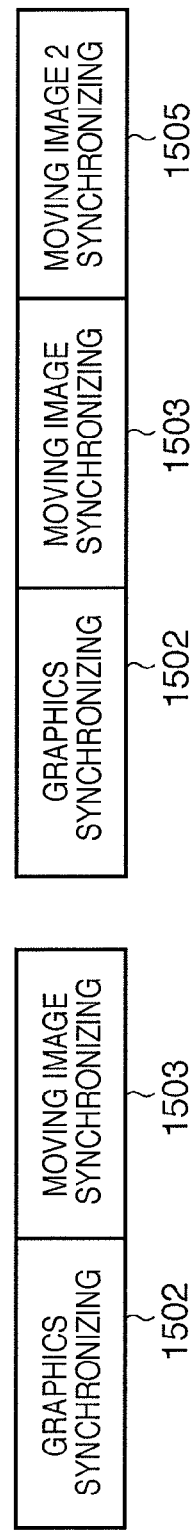
FIGS. 14A and 14B are diagrams illustrating examples of synchronization information.
Figure 14A:

FIG. 14A is a diagram illustrating an example where the graphics drawing unit 1215, having a synchronizing information setting register, transmits synchronizing information 1501 using the synchronizing information path 1214. The synchronizing information 1501 includes graphics synchronizing information 1502 to instruct the graphics output unit 1212 to perform synchronization of output and moving image synchronizing information 1503 to instruct the moving image drawing command output unit 1204 to perform synchronization of output. Assuming that multiple moving image paths 1107 exist and multiple moving image drawing units 1207 are used, the number of fields of the moving image synchronizing information is increased in correspondence with the respective plural moving image paths 1107.

FIG. 14B is a diagram illustrating an example of the synchronizing information 1504 when the number of moving image paths 1107 is two. In FIG. 14B, the synchronizing information 1504 includes moving image 2 synchronizing information 1505 in addition to the graphics synchronizing information 1502 and the moving image synchronizing information 1503 shown in FIG. 14A. Note that the graphics synchronizing information 1502, the moving image synchronizing information 1503 and the moving image 2 synchronizing information 1505 may be independently set. Further, these graphics synchronizing information 1502, the moving image synchronizing information 1503 and the moving image 2 synchronizing information 1505 are respectively 1-bit data. Note that the graphics synchronizing information 1502, the moving image synchronizing information 1503 and the moving image 2 synchronizing information 1505 may be independently set.

In the third embodiment, in order to control the graphics data outputted to the graphics path 1213 and one or more moving image paths 1107 independently, synchronizing information having the graphics synchronizing information 1502, the moving image synchronizing information 1503 and the moving image 2 synchronizing information 1505 is used. However, in a case that synchronized graphics data and synchronized moving image drawing command are always simultaneously outputted, the graphics synchronizing information 1502, the moving image synchronizing information 1503 and the moving image 2 synchronizing information 1505 may be combined as one information.

In the third embodiment, the synchronizing information is issued by setting data in a register in the graphics drawing unit 1215. However, it may be arranged such that a mechanism to transmit the graphics synchronizing information 1502 and the moving image synchronizing information 1503 to the moving image drawing command path 1202 and the graphics path 1213 is realized with another hardware in the graphics drawing unit 1215 or software.

Further, the graphics drawing unit 1215 outputs the synchronizing information as shown in FIG. 14A or 14B to the synchronizing information path 1214 thereby issues instructions for update of processed moving image and synchronized graphics data inputted into the composition unit 1209. Generally, the synchronizing information is issued upon completion of drawing for one frame based on a drawing command inputted via the drawing command path 1103. If a particular portion in one frame is updated before completion of the drawing for one frame, the synchronizing information is issued upon completion of processing of all the drawing commands existing in the portion to be updated. Then the instruction for update of any one or both of the graphics output unit 1212 and the moving image drawing command output unit 1204 is issued.

Returning to the flowchart of FIG. 12, processing of the moving image tag will be described.

If it is determined in step S31 that the drawing tag is not a valid drawing tag, the process proceeds to step S32, in which the graphics drawing unit 1215 determines whether or not the drawing tag is a valid moving image tag. If it is determined in step S32 that the drawing tag is a valid moving image tag, the process proceeds to step S33, in which a moving image handle is generated. Note that if it is determined in step S32 that the drawing tag is not a valid moving image tag, the process proceeds to step S38, in which error processing is performed.

In the third embodiment, the moving image handle is generated by designating a width, a height, image quality information and default transparency of a moving image. Note that types of parameters delivered to the moving image handle are not limited to those in the present invention. Further, in the present embodiment, the Z-order of the moving image handle and the graphics data is defined with a drawing order, however, the Z-order may be explicitly designated in the moving image handle.

Note that the image equality information includes quality information to determine the priorities of image quality and speed upon moving image reproduction. As the default transparency of the moving image, transparency is designated with respect to a moving image without transparency. If moving image data inputted into the image processing apparatus 1106 has transparency, the transparency of the moving image data may be used in a final output.

The process proceeds from step S33 to step S34, in which the graphics drawing unit 1215 links the moving image handle generated in step S33 to the moving image path 1107. Next, in step S35, the graphics drawing unit 1215 generates a moving image drawing command based on the moving image handle linked to the moving image path 1107 in step S34. The generation of moving image drawing command indicates a designation of a moving image handle as the subject of moving image drawing command generation, and a designation of rotation, scaling, moving, masking, clipping, composition, trapezoidal conversion, color conversion, filter processing of the moving image, an instruction for moving image reproduction processing, and a designation of parameter group necessary for the processing. These set values are outputted as a moving image drawing command via the moving image drawing command path 1202 to the moving image drawing command storage unit 1203.

In the third embodiment, rotation, scaling and the like are designated by designation of affine transformation matrix elements. Further, color conversion is designated by designation of a color conversion matrix. Further, the designation of filter processing includes designation of a filter type, and the designation of masking includes a designation of a mask pattern, LUT setting and the like. As the moving image drawing instruction and moving image handle drawing instruction and link to the parameter groups necessary for the drawing instructions are well known as general techniques, the techniques will not be described in detail here. Note that particular moving image processing designated upon generation of moving image drawing command and its parameter group, the link therebetween according to the third embodiment do not impose any limitation on the present invention.

Next, the process proceeds to step S36, in which the graphics drawing unit 1215 outputs an area, in which the moving image inputted via the moving image path 1107 is displayed, to the graphics path 1213. Further, the graphics drawing unit 1215 sets the moving image flag 1406 (FIG. 13) in the area where the moving image exists, and sets the moving image transparency 1405 (FIG. 13) with the default transparency of the moving image designated with the moving image drawing command. Further, if masking processing has been performed in step S35, the moving image mask 1404 (FIG. 13) is set with the mask value.

Thus, if processing of the moving image tag in step S36 or processing of the drawing tag in step S40 or S42 has been completed, the process proceeds to step S37, in which the graphics drawing unit 1215 determines whether or not the drawing processing has been completed. If it is determined that the drawing has been completed, the process ends, while if it is determined that the drawing has not been completed, the process returns to step S31 to continue the drawing processing.

The moving image drawing command storage unit 1203 holds a moving image drawing command inputted via the moving image drawing command path 1202. The moving image drawing command storage unit 1203 may have a common memory or a special-purpose memory or a register. Further, the moving image drawing command storage unit 1203 may have multiple buffers or a single buffer.

In a status where the moving image drawing command storage unit 1203 holds a moving image drawing command, if the synchronizing information shown in FIG. 14A or 14B is inputted via the synchronizing information path 1214, it is determined whether or not the moving image synchronizing information 1503 and the moving image 2 synchronizing information 1505 indicating synchronization of the moving image drawing command are set. If it is determined that the moving image synchronizing information 1503 is set, the moving image drawing command output unit 1204 outputs the moving image drawing command held in the moving image drawing command storage unit 1203 to the synchronizing moving image drawing command path 1205.

Next, the operation of the moving image drawing unit 1207 will be described. The moving image drawing unit 1207 performs moving image drawing processing designated with the moving image drawing command inputted via the synchronizing moving image drawing command path 1205 on the moving image received via the moving image path 1107. The moving image drawing unit 1207 outputs the processed moving image to the processed moving image path 1208.

Next, the operation of the graphics storage unit 1211 will be described. The graphics storage unit 1211 holds graphics data inputted via the graphics path 1213. The graphics storage unit 1211 may have a common memory or a special-purpose memory or a register. Further, the graphics storage unit 1211 may have multiple buffers or a single buffer.

When the graphics output unit 1212 inputs synchronizing information via the synchronizing information path 1214, the graphics output unit 1212 determines whether or not the graphics synchronizing information 1502 indicating synchronization of graphics data is set in the synchronizing information. If it is determined that the graphics synchronizing information 1502 is set, the graphics output unit 1212 outputs graphics data held in the graphics storage unit 1211 as synchronized graphics data to the synchronized graphics path 1210.

Next, the operation of the composition unit 1209 will be described.

The composition unit 1209 receives processed moving image data and synchronized graphics data via the processed moving image path 1208 and the synchronized graphics path 1210, and outputs an image by composing these data as composite image data 1117. The composition processing here may be performed by a known composition unit which composes processed moving image data with synchronized graphics image data in the order of input pixels and outputs composite data.

Figure 15:
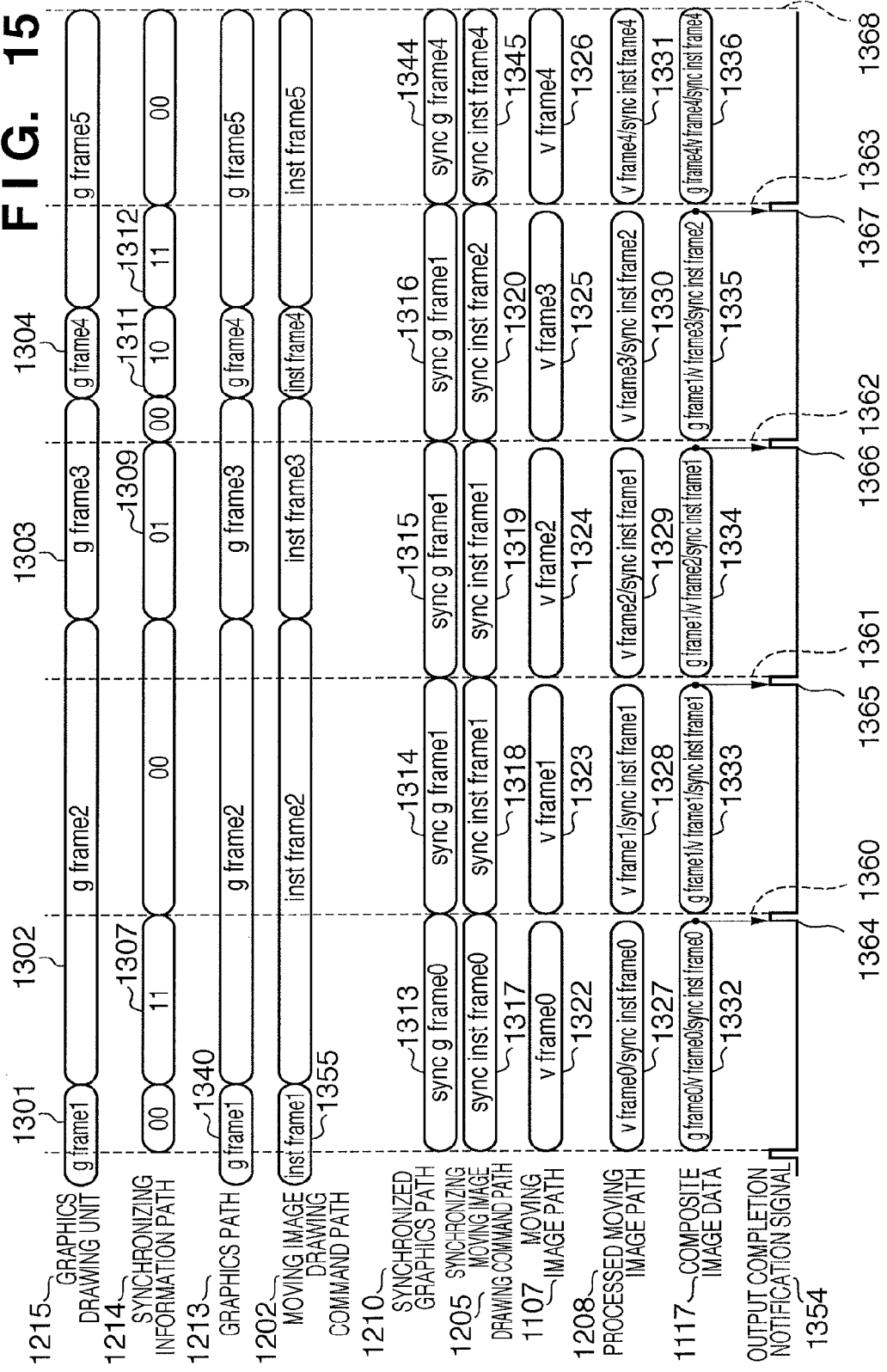
FIG. 15 is a timing chart describing processing in the image processing apparatus according to the third embodiment of the present invention.

FIG. 15 is a timing chart describing processing in the image processing apparatus according to the third embodiment of the present invention. In this example, outputs from the moving image drawing command output unit 1204 and the graphics output unit 1212 are selected by an output completion notification signal 1354.

In FIG. 15, a graphics frame 1 (g frame1) 1301 and a graphics frame 4 (g frame4) 1304 indicate update of both moving image drawing command and graphics data. A graphics frame 2 (g frame2) 1302 indicates only update of the moving image drawing command. A graphics frame 3 (g frame3) 1303 indicates only update of the graphics data. Note that the drawing command for the graphics frames 0 to 4 sequentially arrives at the drawing command path 1103.

On the other hand, a moving image frame 0 (v frame0) 1322, a moving image frame 1 (1323), a moving image frame 2 (1324), a moving image frame 3 (1325) and a moving image frame 4 (1326) are inputted into the moving image path 1107.

At timing 1360, the value of synchronizing information outputted to the synchronizing information path 1214 is "0". Further, drawing commands for graphics data and moving image data in frame 0 in which processing has been completed before timing 1360 (not shown) are outputted to the synchronized graphics path 1210 and the synchronizing moving image drawing command path 1205. These operations are indicated with reference numerals 1313 and 1317 in FIG. 15.

During the period from the timing 1360 to timing 1362, graphics drawing processing is completed before output of the composite image data 1117 for one frame.

When the graphics frame 1 (1301) is inputted via the drawing command path 1103, the graphics drawing unit 1215 processes a drawing command for the graphics frame 1. The graphics drawing unit 1215 outputs the graphics (g frame1) to the graphics path 1213 at timing 1340. Further, at timing 1355, the graphics drawing unit 1215 outputs a moving image drawing command (inst frame1) to the moving image drawing command path 1202. At this time, as indicated with numeral 1322, the moving image drawing command for the moving image frame 1 (v frame1) arrives at the moving image path 1107.

When the drawing processing of the graphics frame 1 has been completed, the graphics drawing unit 1215 issues synchronizing information, in which the graphics synchronizing information 1502 and moving image synchronizing information 1503 are respectively set, to the synchronizing information path 1214 at timing 1307.

The moving image drawing unit 1207 applies the moving image drawing command for the moving image frame 0 generated at timing 1317 to the moving image frame 0 inputted from the moving image path 1107 to the moving image drawing unit 1207 at timing 1322. Then at timing 1327, the moving image drawing unit 1207 outputs the moving image frame as a processed moving image frame 0 (v frame0/sync inst frame0) at timing 1327.

The composition unit 1209 composes the processed moving image frame 0 generated at the timing 1327 with synchronized graphics frame 0 (sync g frame0) generated at timing 1313. Then at timing 1332, the composition unit 1209 outputs a composite output frame 0 (g frame0/v frame0/sync inst frame0). When the processing of the composite output frame 0 has been completed, the composition unit 1209 issues a pulse signal as an output completion notification signal 1354 at timing 1364. The pulse signal designates a reset of synchronized information, a switching of output of synchronized graphics data from the graphics output unit 1212 and a switching of output of moving image drawing command from the moving image drawing command output unit 1204.

At timing 1323, the moving image frame 1 (v frame1) is inputted to the moving image path 1107. At timing 1307 before the input of the moving image frame 1, the instruction for synchronization between the graphics data and moving image data is given. Accordingly, in this case, the graphics output unit 1212 outputs the synchronized graphics frame 1 (sync g frame1) to the synchronized graphics path 1210 at timing 1314. On the other hand, the moving image drawing command output unit 1204 outputs the synchronizing moving image drawing command frame 1 (sync inst frame1) to the synchronizing moving image drawing command path 1205 at timing 1318. By this operation, the moving image drawing unit 1207 receives the moving image drawing command for the moving image frame 1, then at timing 1323, applies the command to the moving image frame 1 inputted from the moving image path 1107 to the moving image drawing unit 1207. Then at timing 1328, the moving image drawing unit 1207 outputs the moving image frame as a processed moving image frame 1 (v frame1/sync inst frame1).

By the above operation, the composition unit 1209 composes the processed moving image frame 1 generated at the timing 1328 with the synchronized graphics frame 1 generated at the timing 1314. Then at timing 1333, the composition unit 1209 outputs a composite output frame 1 (g frame1/v frame1/sync inst frame1). When the processing of the composite output frame 1 has been completed, the composition unit 1209 issues a pulse signal 1365 as the output completion notification signal 1354.

During the period from timing 1361 to timing 1363 in FIG. 15, when output of the composite image data 1117 for one frame has been completed, drawing for one frame by the graphics drawing processing has not been completed.

In this example, the drawing processing at the timing 1302 is not completed at the timing 1361. Accordingly, at the timing 1361, the result of drawing of the graphics frame 2 and the moving image drawing command frame 2 cannot be utilized. In this case, the graphics output unit 1212 outputs the synchronized graphics frame 1 (sync g frame1) available at the timing 1361 to the synchronized graphics path 1210 at timing 1315. Further, the moving image drawing command output unit 1204 outputs the synchronizing moving image drawing command frame 1 (sync inst frame1) available at the timing 1361 to the synchronizing moving image drawing command path 1205 at timing 1319.

By these operations, the moving image drawing unit 1207 applies the moving image drawing command for the moving image frame 1 generated at the timing 1319 to the moving image frame 2 inputted via the moving image path 1107 to the moving image drawing unit 1207 at timing 1324. Then the moving image drawing unit 1207 outputs a processed moving image frame 2 (v frame2/sync inst frame1) at timing 1329.

The composition unit 1209 composes the processed moving image frame 2 generated at the timing 1329 with the synchronized graphics frame 1 outputted at the timing 1315. Then the composition unit 1209 outputs the frame 2 (g frame1/v frame2/sync inst frame1) at timing 1334. When the composition processing of the frame 2 at the timing 1334 has been completed, the composition unit 1209 issues a pulse signal 1366 as the output completion notification signal 1354.

Next, during the period from timing 1361 to timing 1362, upon completion of the drawing of the frame 2 by the graphics drawing unit 1215, only the moving image drawing command output unit 1204 is instructed to perform synchronization of output. As the synchronizing information is "01", only the moving image synchronizing information 1503 is "1".

When the drawing processing at the timing 1302 has been completed, the graphics drawing unit 1215 outputs at timing 1309, synchronizing information instructing only the moving image drawing command output unit 1204 to perform synchronization. At this time, the graphics drawing unit 1215 resets the graphics synchronizing information 1502 in the synchronizing information and sets only the moving image synchronizing information 1503 to "1". Accordingly, at the timing 1362, the moving image drawing command frame 2 and the graphics frame 1 are available.

The graphics output unit 1212 outputs the synchronized graphics frame 1 (sync g frame1) to the synchronized graphics path 1210 at timing 1316. On the other hand, the moving image drawing command output unit 1204 outputs, at timing 1320, the synchronizing moving image drawing command frame 2 (sync inst frame2) available at the timing 1362 to the synchronizing moving image drawing command path 1205.

The moving image drawing unit 1207 applies, at timing 1325, the moving image drawing command for the moving image frame 2 generated at the timing 1320 to the moving image frame 3 (v frame3) inputted from the moving image path 1107 to the moving image drawing unit 1207. Then the moving image drawing unit 1207 outputs a processed moving image frame 3 (v frame3/sync inst frame2) at timing 1330.

By this operation, the composition unit 1209 composes the processed moving image frame 3 generated at the timing 1330 with the synchronized graphics frame 1 (sync g frame1) outputted at the timing 1316. Then the composition unit 1209 outputs a composition output frame 3 (g frame1/v frame3/sync inst frame2) at timing 1335. When the processing of the composition output frame 3 indicated at the timing 1335 has been completed, the composition unit 1209 issues a pulse signal 1367 as the output completion notification signal 1354.

During the period from timing 1363 to timing 1368, the graphics drawing unit 1215 completes drawing of multiple frames before completion of output of the composite image data 1117 for one frame.

In the third embodiment, drawing of the graphics frame 3 is completed at timing 1303, and the graphics synchronizing information 1502 is set to "10" at timing 1311. Further, drawing of the graphics frame 4 is completed at timing 1304, and the both graphics synchronizing information 1502 and moving image synchronizing information 1503 are set ("11") at timing 1312. When the drawing processing at the timing 1304 has been completed, synchronization between the graphics data and the moving image data is instructed at timing 1312. Accordingly, at timing 1363, the graphics frame 4 (g frame4) and the moving image drawing command frame 4 (sync inst frame4) are available. In this manner, when the graphics drawing unit 1215 completes drawing of multiple frames before completion of output by the composition unit 1209 for one frame, the moving image drawing unit 1207 and the composition unit 1209 use latest graphics data and moving image drawing command at the timing 1363.

The graphics output unit 1212 outputs a synchronized graphics frame 4 (sync g frame4) to the synchronized graphics path 1210 at timing 1344. Further, the moving image drawing command output unit 1204 outputs the synchronizing moving image drawing command frame 4 (sync inst frame4) to the synchronizing moving image drawing command path 1205 at timing 1345.

The moving image drawing unit 1207 applies the moving image drawing command for the moving image frame 4 generated at the timing 1345 to the moving image frame 4 inputted via the moving image path 1107 to the moving image drawing unit 1207 at timing 1326. Then the moving image drawing unit 1207 outputs a processed moving image frame 4 (v frame4/sync inst frame4) at timing 1331. Thus the composition unit 1209 composes the processed moving image frame 4 generated at the timing 1331 with the synchronized graphics frame 4 generated at the timing 1344. Then the composition unit 1209 outputs a composite output frame 4 (g frame4/v frame4/sync inst frame4) at timing 1336.

As described above, the image processing apparatus 1106 which displays moving image data and graphics data in synchronization with each other is realized.

As described above, according to the third embodiment, synchronized display of graphics data and moving image data can be performed.

Further, according to the third embodiment, upon synchronization between graphics data and moving image data, when graphics data and moving image data are synchronized during output for one frame, the graphics data and the moving image data can be updated at the point of frame change.

Other Embodiment

The present invention can be applied to a system constituted by a plurality of devices or to an apparatus comprising a single device.

Further, the object of the present invention can also be achieved by providing a software program for performing functions of the above-described embodiments directly or remotely to a system or an apparatus, reading the supplied program with a computer of the system or apparatus, then executing the program. In this case, as long as the system or apparatus has the functions of the program, the mode of implementation need not rely upon a program.

Furthermore, besides the functions according to the above-described embodiments are realized by executing the program which is read by a computer from a storage medium, the present invention includes a case where an OS or the like working on the computer performs a part or entire actual processing in accordance with designations of the program code and realizes the functions according to the above embodiments.

Furthermore, the present invention also includes a case where, after the program read from the storage medium is written in a function expansion card which is inserted into the computer or in a memory provided in a function expansion unit which is connected to the computer, CPU or the like contained in the function expansion card or unit performs a part or entire process in accordance with designations of the program and realizes functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-175906 filed Jul. 4, 2008 and 2008-181979 filed Jul. 11, 2008, which are hereby incorporated by reference herein in their entirety.

What is claimed is:

1. An image processing apparatus for receiving a drawing command including a moving image drawing command and a graphics drawing command and executing drawing processing, comprising:
    a CPU configured to carry out functions of a graphic drawing unit, a graphics image holding unit, a moving image drawing command holding unit, a moving image drawing command output unit, a moving image drawing unit, a graphics output unit, and a composition unit;
    the graphics drawing unit configured to generate the moving image drawing command, the graphics drawing command and synchronizing information from the drawing command and execute the graphics drawing command to output graphics data;
    the graphics image holding unit configured to hold the graphics data output by the graphics drawing unit;
    the moving image drawing command holding unit configured to hold the moving image drawing command generated by the graphics drawing unit;
    the moving image drawing command output unit configured to output a synchronized moving image drawing command from the moving image drawing command holding unit in accordance with the synchronizing information generated by the graphics drawing unit;
    the moving image drawing unit configured to execute the synchronized moving image drawing command on an input moving image and obtain processed moving image data;
    the graphics output unit configured to output synchronized graphic data from the graphics image holding unit in accordance with the synchronizing information generated by the graphics drawing unit; and
    the composition unit configured to generate composite image data by compositing the synchronized graphics data with the processed moving image data obtained by the moving image drawing unit,
    wherein, the synchronized graphics data and the processed moving image data are updated corresponding to a frame change on the screen.

2. The image processing apparatus according to claim 1, in a case that a plurality of moving images are input, the graphics drawing unit generates the synchronizing information respectively corresponding to the plurality of moving images.

3. A control method for an image processing apparatus for receiving a drawing command including a moving image drawing command and a graphics drawing command and executing drawing processing, the method comprising:
    a graphics drawing step of generating the moving image drawing command, the graphics drawing command and synchronizing information from the drawing command and executing the graphics drawing command to output graphics data;
    a graphics image holding step of holding the graphics data output in the graphics drawing step;
    a moving image drawing command holding step of holding the moving image drawing command generated in the graphics drawing step;
    a moving image drawing command output step of outputting a synchronized moving image drawing command from the moving image drawing command held in the moving image drawing command holding step in accordance with the synchronizing information generated in the graphics drawing step;

a moving image drawing step of executing the synchronized moving image drawing command on an input moving image and obtaining processed moving image data;

a graphics output step of outputting synchronized graphic data from the graphics data held in the graphics image holding step in accordance with the synchronizing information generated in the graphics drawing step; and a composition step of generating composite image data by compositing the synchronized graphics data with the processed moving image data, wherein, the synchronized graphics data and the processed moving image data are updated corresponding to a frame change on the screen.

4. The method according to claim 3, in a case that a plurality of moving images are input, the graphics drawing step generates the synchronizing information respectively corresponding to the plurality of moving images.

\* \* \* \* \*